(12) United States Patent
Pani et al.

(10) Patent No.: US 12,399,746 B1
(45) Date of Patent: Aug. 26, 2025

(54) DYNAMIC TASK CONFIGURATION WITHOUT TASK RESTART

(71) Applicant: Amazon Technologies, Inc., Seattle, WA (US)

(72) Inventors: Ayaskant Pani, Fremont, CA (US); Matias Guido Tencer, North Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 276 days.

(21) Appl. No.: 17/362,812

(22) Filed: Jun. 29, 2021

(51) Int. Cl.
*G06F 9/445* (2018.01)
*G06F 8/656* (2018.01)
*G06F 9/50* (2006.01)
*G06F 9/54* (2006.01)

(52) U.S. Cl.
CPC ........ *G06F 9/5038* (2013.01); *G06F 9/44505* (2013.01); *G06F 9/505* (2013.01); *G06F 9/5077* (2013.01); *G06F 9/546* (2013.01); *G06F 8/656* (2018.02); *G06F 9/5061* (2013.01); *G06F 9/5066* (2013.01); *G06F 9/5072* (2013.01)

(58) Field of Classification Search
None
See application file for complete search history.

(56) References Cited

U.S. PATENT DOCUMENTS

| | | | |
|---|---|---|---|
| 8,190,720 B1 | 5/2012 | Yellai et al. | |
| 8,826,070 B1 | 9/2014 | Havemose et al. | |
| 8,856,374 B2 * | 10/2014 | Uhlig | G06F 9/00 709/231 |
| 9,047,129 B2 * | 6/2015 | Pack | G06F 9/505 |
| 9,354,977 B1 | 5/2016 | Backensto et al. | |
| 9,652,568 B1 | 5/2017 | Tzelnic et al. | |
| 9,946,593 B2 | 4/2018 | Bishop et al. | |
| 9,965,330 B2 | 5/2018 | Bishop et al. | |
| 9,990,383 B2 | 6/2018 | Brinnand | |
| 10,122,783 B2 | 11/2018 | Qiao et al. | |
| 10,146,592 B2 | 12/2018 | Bishop et al. | |
| 10,387,426 B2 | 8/2019 | Singh et al. | |
| 10,606,711 B2 | 3/2020 | Bishop et al. | |
| 10,609,059 B2 | 3/2020 | Apostolopoulos | |
| 10,620,924 B2 | 4/2020 | Stojanovic et al. | |
| 10,756,991 B2 | 8/2020 | Layman et al. | |

(Continued)

OTHER PUBLICATIONS

U.S. Appl. No. 17/362,806, filed Jun. 29, 2021, Ayaskant Pani, et al.

*Primary Examiner* — Abu Zar Ghaffari
(74) *Attorney, Agent, or Firm* — S. Scott Foster; Kowert, Hood, Munyon, Rankin & Goetzel, P.C.

(57) ABSTRACT

A task manager assigns configurations to task nodes, where the task nodes perform tasks in accordance with the configurations assigned to them. The task manager creates a record comprising a new configuration assigned to a task node, along with an identifier of that task node. The task manager adds these created records to a shared task configuration data structure. A task node accesses the shared task configuration data structure to look for new records with its identifier. The task node obtains a new record from the shared task configuration data structure, and analyzes the obtained new record to determine its assigned new configuration. The task node configures itself in accordance with the new configuration, without restarting the individual task node.

20 Claims, 15 Drawing Sheets

(56) References Cited

U.S. PATENT DOCUMENTS

| | | | |
|---|---|---|---|
| 10,783,044 B2 | 9/2020 | Zhao et al. | |
| 10,891,413 B1 | 1/2021 | Kundarewich et al. | |
| 10,908,977 B1 | 2/2021 | Ferstay et al. | |
| 10,944,807 B2 | 3/2021 | Paduroiu | |
| 11,113,287 B1* | 9/2021 | Landry | G06F 16/3331 |
| 2002/0174331 A1* | 11/2002 | Nock | G06F 9/54 |
| | | | 713/100 |
| 2002/0174379 A1 | 11/2002 | Korenevsky et al. | |
| 2003/0101245 A1* | 5/2003 | Srinivasan | G06F 9/44505 |
| | | | 709/221 |
| 2007/0220149 A1* | 9/2007 | Kawashima | H04L 67/1008 |
| | | | 709/226 |
| 2009/0132801 A1* | 5/2009 | White | G06F 9/44505 |
| | | | 713/100 |
| 2009/0320038 A1* | 12/2009 | Garbow | G06F 11/3404 |
| | | | 718/105 |
| 2010/0083283 A1 | 4/2010 | Kharat et al. | |
| 2013/0152103 A1 | 6/2013 | Jea et al. | |
| 2014/0298333 A1* | 10/2014 | Yoshida | G06F 9/5088 |
| | | | 718/1 |
| 2015/0062606 A1* | 3/2015 | Suzuki | H04N 1/00891 |
| | | | 358/1.13 |
| 2015/0095372 A1* | 4/2015 | Andrews | G06F 16/951 |
| | | | 707/770 |
| 2015/0242234 A1* | 8/2015 | Harris | G06F 9/5072 |
| | | | 718/1 |
| 2016/0112262 A1* | 4/2016 | Johnson | G06F 9/4411 |
| | | | 709/221 |
| 2016/0188373 A1* | 6/2016 | Tameshige | G06F 9/50 |
| | | | 718/103 |
| 2016/0188628 A1* | 6/2016 | Hartman | G06F 9/5072 |
| | | | 707/770 |
| 2016/0283261 A1* | 9/2016 | Nakatsu | G06F 9/45558 |
| 2017/0041191 A1* | 2/2017 | Kato | H04L 41/0897 |
| 2017/0104641 A1* | 4/2017 | Bradshaw | G06T 1/20 |
| 2017/0322744 A1* | 11/2017 | Chan | G06F 3/0629 |
| 2018/0024863 A1* | 1/2018 | Jagadeesh | G06F 9/4881 |
| | | | 709/226 |
| 2018/0068004 A1 | 3/2018 | Lavasani | |
| 2018/0239636 A1* | 8/2018 | Arora | G06F 9/485 |
| 2018/0239646 A1* | 8/2018 | Yamakawa | G06F 9/5077 |
| 2018/0246710 A1* | 8/2018 | Kim | G06F 9/4406 |
| 2018/0285263 A1* | 10/2018 | Ghazaleh | H04L 67/1097 |
| 2019/0102418 A1 | 4/2019 | Vasudevan et al. | |
| 2019/0163539 A1 | 5/2019 | Bishop et al. | |
| 2019/0171650 A1 | 6/2019 | Botev et al. | |
| 2019/0235868 A1 | 8/2019 | Siskind et al. | |
| 2019/0332318 A1 | 10/2019 | Gooding et al. | |
| 2020/0201667 A1* | 6/2020 | Chen | G06F 9/455 |
| 2020/0334067 A1* | 10/2020 | Liu | G06F 9/544 |
| 2020/0401458 A1* | 12/2020 | Roy | G06F 9/4887 |
| 2021/0042280 A1 | 2/2021 | Sharma et al. | |
| 2021/0326356 A1* | 10/2021 | Cruanes | G06F 16/221 |
| 2021/0377117 A1* | 12/2021 | Kanevsky | H04L 41/40 |
| 2021/0406035 A1* | 12/2021 | Price | G06F 11/3055 |
| 2022/0398128 A1* | 12/2022 | Jose, Jr. | G06F 9/4881 |

\* cited by examiner

DYNAMIC TASK CONFIGURATION WITHOUT TASK RESTART

BACKGROUND

As the costs of data storage have declined over the years, and as the ability to interconnect various elements of the computing infrastructure have improved, more and more data pertaining to a wide variety of applications can be collected and analyzed. For example, mobile phones can generate data indicating their locations, the applications being used by the phone users, and so on, at least some of which can be collected and analyzed in order to present customized coupons, advertisements and the like to the users. The analysis of data collected by surveillance cameras may be useful in preventing and/or solving crimes, and data collected from sensors embedded at various location within airplane engines, automobiles or complex machinery may be used for various purposes such as preventive maintenance, improving efficiency and lowering costs.

The increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system while also providing application isolation and security among the various virtual machines. Furthermore, some virtualization technologies are capable of providing virtual resources that span two or more physical resources, such as a single virtual machine with multiple virtual processors that spans multiple distinct physical computing systems. In addition to computing platforms, some large organizations also provide various types of storage services built using virtualization technologies. Using such storage services, large amounts of data can be stored with desired durability levels.

Despite the availability of virtualized computing and/or storage resources at relatively low cost from various providers, however, the management and orchestration of the collection, storage and processing of large dynamically fluctuating streams of data remains a challenging proposition for a variety of reasons. As more resources are added to a system set up for handling large streams of data, for example, imbalances in workload between different parts of the system may arise. If left unaddressed, such imbalances may lead to severe performance problems at some resources, in addition to underutilization (and hence wastage) of other resources.

One way to address imbalances is to repartition the workload among the resources. However, systems that handle large streams of data require the resources to be restarted whenever repartitioning occurs. Some systems even require all resources to be restarted whenever any repartitioning occurs. This greatly increases delay and can lead to severe performance problems at resources. In addition, when restarting does occur, the restart process itself can lead to even more delay. Systems set up for handling large streams of data require resources to search through lengthy logs or streams in order to determine their previous state, in order for them to begin where a restarted resource left off. This extensive search for the state of previous resources can lead to even further delay.

Figure 1:
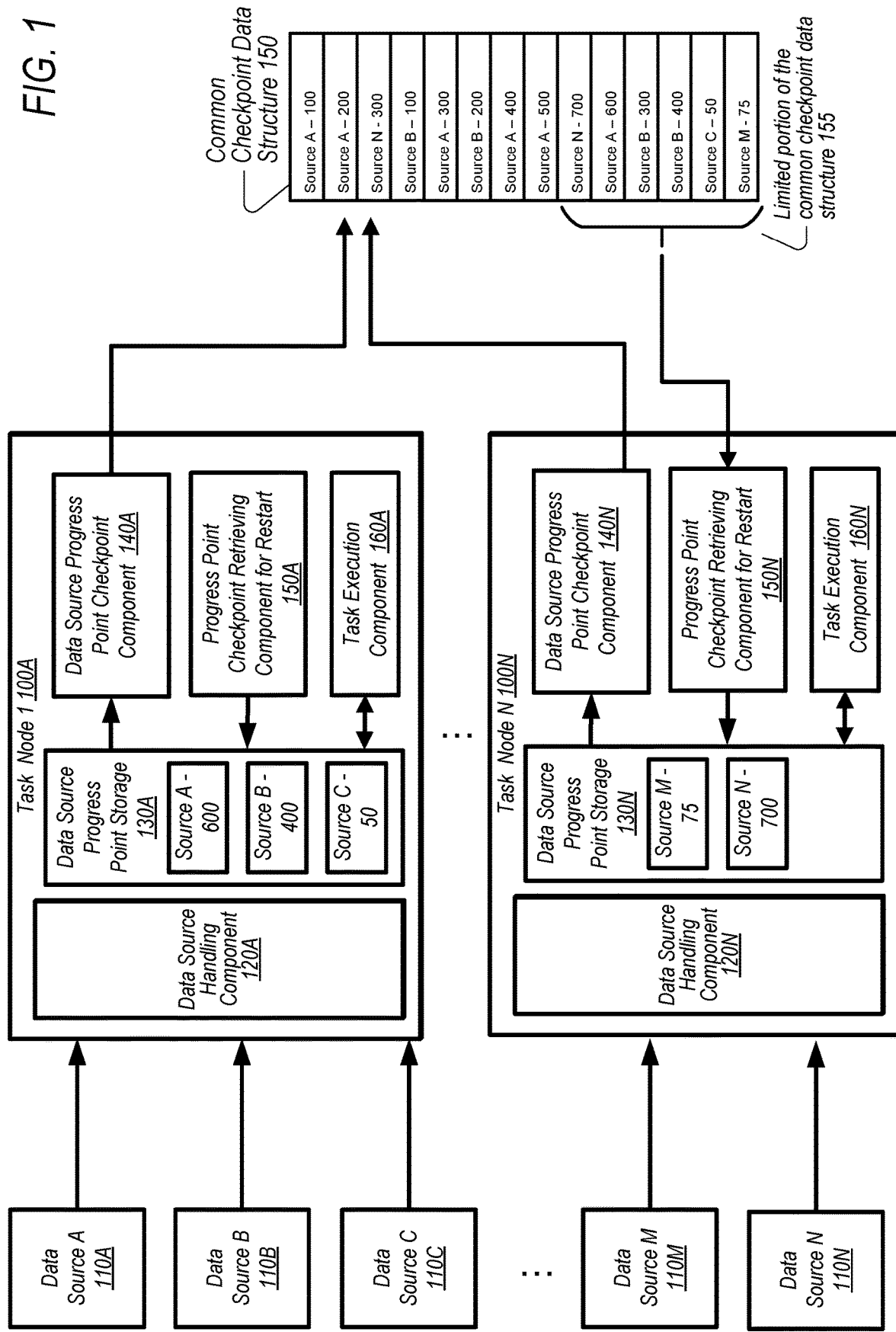
FIG. 1 is a logical block diagram depicting faster restart of task nodes using periodic checkpointing of data sources comprising task nodes that obtain data from data sources, store data source progress points for the data sources, execute tasks using the obtained data, checkpoint the data source progress points into a common checkpoint data structure, and retrieve the progress points during restart by analyzing only a limited portion of the common checkpoint data structure, according to some embodiments.

While embodiments are described herein by way of example for several embodiments and illustrative drawings, those skilled in the art will recognize that the embodiments are not limited to the embodiments or drawings described. It should be understood, that the drawings and detailed description thereof are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments described herein relate to improvements for a data ingestion service capable of faster restart of task nodes using periodic checkpointing of data sources and/or dynamic task configuration without task restart. The data ingestion service periodically or occasionally checkpoints logical offsets of data sources into a common data structure, so that upon restart only a recent portion of the data structure needs to be examined in order to determine the state of the data ingestion service's interaction with the data sources. The data ingestion service, in some other embodiments, allows tasks to be configured or partitioned and reconfigured or repartitioned by a task manager without restarting the individual tasks. The data ingestion service capable of faster restart of task nodes using periodic checkpointing of data sources reduces delay and leads to improved performance at resources. The data ingestion service capable of dynamic task configuration without task restart also reduces delay and leads to improved performance at resources.

The improved data ingestion service also leads to faster restart of task nodes in a data ingestion system of data store, in some embodiments. The data store can be a distributed data store optimized for ingesting and processing streaming data, in some of these embodiments. In some embodiments, this distributed data store can be Apache Kafka. In some of these embodiments, the data ingestion system might be Kafka Connect.

A data ingestion system of a distributed data store, such as source connectors in Kafka and/or Kafka Connect, provides data from a source to the distributed data store. The data ingestion system reads data from one location, and writes the data into a distributed data store. The data ingestion system can read from, for example, a file, a file system, a database, a data stream, an IoT device service, a log data service, a log storage service, are just some of many examples where data can be read from. In some of these embodiments, when data is written into the distributed data store, two different data structures are written to. One data structure can be the output data structure, where the actual data is written, and the other data structure can be a common checkpoint data structure, such as an offset data structure or an offset topic, that keeps track of the offset of the source.

In Kafka, for example, a source connector can be a process that manages the various tasks that actually perform the data movement for that connector from sources to the output topic. There can be any number of tasks for a particular connector, in some embodiments. The source connector acts as a manager for the tasks. It can expose a management API for modification, task reconfiguration, etc. The tasks are hosted on task nodes, that can be hosting one or more tasks. If the task node fails, then all the tasks being hosted by that task node would need to be restarted, either on the restarted task node or a new task node.

For example, if data is being read from a file, then the offset of the file is stored in the common offset data structure. If 10 lines of a particular file are read, as a further example, then those 10 lines of output will be produced to the output data structure. In addition, the number 10 might be written to the common checkpoint data structure (along with an indicator of the particular. file) to indicate that 10 lines have been read from that particular file. If the data ingestion system fails, or a portion of the data ingestion system (such as a task of the data ingestion system) fails, then the system and/or task might be restarted, in some embodiments. When the system (or a portion thereof) is restarted, then the system (and/or the portion of the system) can analyze the common checkpoint data structure in order to resume from line number 10 (or the line after line number 10 as the case may be).

The data ingestion system of a distributed data store can, therefore, read this common checkpoint data structure, such as an internal offset data structure and/or internal offset topic, to retrieve the checkpoint information for data sources upon restart, in some embodiments. The data ingestion system and/or portion of the data ingestion system (such as a source connection task) keeps track of where it is in the source data, such that during a restart it can then look at the common checkpoint data structure in order to determine where to resume with the source data. In the embodiments where the distributed data store is Apache Kafka, Kafka provides and manages an internal offset topic to keep track of offset information for one or more connectors, such that if there is a restart, then that information is available for the one or more connectors to analyze and determine where they need to restart from.

When an offset is stored in the common checkpoint data structure, in some embodiments, it is stored along with an identifier of the source (such as a key) to which the offset pertains. For example, an identifier of a particular source along with the offset of that particular source is stored as one entry in the common checkpoint data structure. In some embodiments, all the offsets for all the data sources of a data ingestion system are entered into the common checkpoint data structure. In other embodiments, all the offsets for a given source connector for all the data sources of the given source connector are entered into the common checkpoint data structure. A given data ingestion system and/or a given source connector might encompass multiple tasks, where a given task is responsible for multiple sources, in some embodiments.

When some additional information is read from that particular source, then an additional entry might be added to the common checkpoint data structure. For example, for a particular source A, an entry of 100 might be included in the common checkpoint data structure to show that 100 items of data were read from that source. Then when 200 items of data have been read, an entry of 200 might be added to the common checkpoint data structure for that particular source.

Any particular source, such as source A for example, might have multiple entries at different points in time in the common checkpoint data structure, in some embodiments. Source A, for example, can have multiple entries in the common checkpoint data structure for 100, 200, 300, 400, 500, and 600 items of data that have been read from source A. Each data source might have multiple, such as hundreds or thousands or millions, of entries in the common checkpoint data structure. With hundreds or thousands or millions of data sources being read from, the size of the common checkpoint data structure can be very large. Furthermore, the size of the common checkpoint data structure increases exponentially as either the number or sources or the number of checkpoint entries per source increases. For example, the data ingestion system might be reading from a file system with a million files, which would mean a million different sources. If the data ingestion system is reading 100 lines per second from each file, and checkpoints after each second, then in 10 seconds there would be 10 million entries entered into the common checkpoint data structure.

However, only the latest entry for any given source is relevant at any given time. The previous entries for a source contain old offset data for that source which is no longer relevant. Since only the latest entry is relevant, then this common checkpoint data structure can be log-compacted, in some embodiments. For example, in the embodiments that use Kafka, Kafka provides a way to compact the offset topic to keep only the latest entry for a given individual data source. However, the log compaction might happen infrequently, such as only once an hour for example. In addition, the log compaction might not happen with any certainty, and might only be implemented whenever system resources have lower usage to allow for a log compaction.

In the time between log compactions, however, the number of entries per data source in the common checkpoint data structure, and the size of the common checkpoint data structure itself, might become very large. Depending on the frequency of any log compaction, the busyness of the data ingestion system's tasks, and the number of unique items being check-pointed, the common checkpoint data structure might have a lot of entries to logically compact in memory before the data ingestion system can find out the relevant check-points for its data sources.

In addition, there might be no certainty about where the latest entry for any given data source might be located in the common checkpoint data structure. In other words, there is no guarantee that all the latest entries for all the corresponding data sources will be encountered in any given portion of the common checkpoint data structure. If the data source has been actively read from recently, then there will probably be a recent entry in the common checkpoint data structure for that source. However, if a data source has been inactive for a period of time, then the latest entry for that source might be in the beginning or somewhere in the middle of the common checkpoint data structure, in some embodiments. The latest entry of an inactive data source might be millions of records away from the latest entry of an active data source in the common checkpoint data structure, for example.

Any given restarted data ingestion system (or restarted portion of the data ingestion system) might be responsible for multiple data sources with different frequencies of activity. In order to find the latest entry for each of these data sources, the restarted system (or portion of the system) might have to analyze a large portion, if not all, of the common checkpoint data structure in order to retrieve entries for the individual corresponding data sources. If the common checkpoint data structure was a time ordered stack or log, for example, then the restarted system (or portion of the system) might have to start analyzing the end of the log (or stack), and analyze every entry from the end, until at least 1 entry for every corresponding data source is found in the common checkpoint data structure, in some embodiments.

The data ingestion service capable of faster restart of task nodes using periodic checkpointing of data sources can solve some of these as well as other problems, in some embodiments, by ensuring that each task belonging to the data ingestion system periodically checkpoints the logical-offset of the data sources to the internal offset data structure. This can be accomplished by the data ingestion system (or a portion of the data ingestion system such as a task node) checkpointing one or more data source progress points, for each of the one or more data sources whose data is being used to perform the one or more tasks, into the common checkpoint data structure at least once every set time interval. The set time interval might be every 5 minutes, for example. Thus, multiple individual ones of the task nodes checkpoint data source progress points for multiple different ones of the plurality of data sources in the common checkpoint data structure.

This checkpointing might be accomplished in multiple different ways, depending on the embodiment. The data ingestion system, or a task node of the data ingestion system, might only checkpoint data source progress points for inactive data sources, where entries have not been made for those inactive data sources during the previous time interval, in some embodiments. Thus, the data ingestion system, or a task node of the data ingestion system, might checkpoint at least one data source progress point for at least one data source into the common checkpoint data structure responsive to completion of a task where data is obtained from the at least one data source by the individual task node. In addition, the data ingestion system, or a task node of the data ingestion system, might checkpoint, at least once during the specific set time interval, a last data source progress point for another data source, even if no task was performed by the data ingestion system (or the individual task node) using data from the other data source during the specific set time interval, in some of these embodiments.

In other embodiments, the data ingestion system, or a task node of the data ingestion system, might checkpoint data source progress points for all data sources every time interval, regardless of how active or inactive the data sources are. Thus, the data ingestion system, or a task node of the data ingestion system, might periodically checkpoint a last data source progress point, for each of the one or more data sources whose data is being obtained by the data ingestion system or the individual task node, into the common checkpoint data structure regardless of how recently data was obtained by the data ingestion system or the individual task node for each of the one or more data sources, in some of these embodiments.

In other embodiments, the data ingestion system, or a task node of the data ingestion system, might produce at least one output record during a set time interval for every data source corresponding to the data ingestion system (or task node of the data ingestion system). These output records might either be genuine records coming from the data sources, or fake records when the source is not producing new records within the set time interval, in some embodiments. The fake records might carry proper metadata so that downstream consumers can ignore them safely, in some embodiments. The fake records might simply be null, in some embodiments. Therefore, the data ingestion system (or a task node of the data ingestion system, for example) can provide a fake record for each of data sources whose data is being used to perform its tasks, to one or more output data streams of a streaming data store at least once every set time interval. The data ingestion system (or the task node of the data ingestion system) can, responsive to the providing the fake record to the output data streams, checkpoint a last actual data source progress point into the common checkpoint data structure. As stated above, this fake record can comprise information indicating that downstream systems should ignore the fake record.

Upon restart of one or more tasks, the logical offset data structure need not be read from the beginning, in some embodiments. Instead the data ingestion system can find the starting point (such as the sequence number) based on a time-stamp, in some of these embodiments. Since the data ingestion service capable of faster restart of task nodes using periodic checkpointing of data sources ensures that the tasks of a data injection system checkpoints progress points of data sources within a previous time interval, in some embodiments, the data ingestion system just needs to examine the common checkpoint data structure for the previous time interval, in these embodiments. The data ingestion service capable of faster restart of task nodes using periodic checkpointing of data sources will ensure that there is at least one entry in the common checkpoint data structure for all corresponding data sources during this previous time interval. Some active data sources will have more than one entry during this previous time interval, but some inactive data sources will only have one entry in the common checkpoint data structure during this time interval. However, each data source should have at least one entry in the common checkpoint data structure during this time interval.

Thus, after restart, the data ingestion system, or one particular task node of the data ingestion system, can perform a determination of where to resume obtaining data from the data sources whose data is being obtained by the data ingestion system (or the particular task node of the data ingestion system). In order to perform this determination, the data ingestion system, or the task node of the data ingestion system, can determine a limited portion of the common checkpoint data structure based on the set time interval, can analyze the limited portion of the common checkpoint data structure, without analyzing the remainder of the common checkpoint data structure, and can retrieve, from the limited portion of the common checkpoint data structure, the one or more data source progress points for the one or more data sources whose data is being obtained by the particular task node. After retrieving the data source progress points, the data ingestion system, or a task node of the data ingestion system, can resume obtaining data from the data sources based at least in part on the retrieved data source progress points, in order to resume performing the tasks using the data from the one or more data sources.

The common checkpoint data structure can be ordered by time, in some embodiments. In some of these embodiments, the common checkpoint data structure can be accessed by the times the entries were created. For example, the data ingestion system (or a particular task node of the data ingestion system) can access the common checkpoint data structure starting either with the latest record in the common checkpoint data structure, or the earliest record, or it can start reading at records before or after a given timestamp, in some of these embodiments. Therefore, if the set time interval were 5 minutes, for example, then just the entries of the common checkpoint data structure for the last 5 minutes might be accessed, in some embodiments. In the embodiments where the distributed data store is Apache Kafka, Kafka lets tasks read from its offset topic by timestamp, for example. Kafka provides a mechanism that allows its offset topic to be accessed at a starting location that corresponds to the record created closest to a given timestamp. Once a starting location of the offset topic is determined, then the offset topic can be accessed sequentially, starting from that starting location, in some embodiments.

In some other embodiments the data ingestion system might examine the common checkpoint data structure for a previous time interval plus a grace or buffer period, where the grace period might be the time for a task restart for example. If checkpointing of the data sources occurs at least once during the previous time interval, and if it takes a certain amount of restart time to restart a data ingestion system (or a task node of the data ingestion system) then the portion of the common checkpoint data structure to analyze would be the portion that encompasses at least the past time interval plus the task restart time. Since the task restart time might vary, a sufficient grace period can be added to the set time interval that is large enough to accommodate all (or at least most of) the task restart times, in some embodiments.

The data ingestion system (or a task node of the data ingestion system) might further tighten the uncertainty of the time window corresponding to the portion of the common checkpoint data structure to be analyzed, by deducing the last system or task crash time, and using this time to only examine a further limited portion of the internal offset data structure. If it is known that a task node failed at a certain fail time, then the portion of the common checkpoint data structure to analyze is the portion corresponding to the set time interval that ends at the fail time. For example, if it is known that a task node failed at 2 pm, and if the set time interval is 5 minutes (such that all data sources are checkpointed at least once every five minutes), then the records of the common checkpoint data structure to be analyzed for the restart of that task node are only the records that were created from 1:55 pm until 2 pm. The remaining portion of the common checkpoint data structure does not need to be analyzed in these embodiments. Only the portion of the common checkpoint data structure corresponding to the set time interval before the fail time of the system or task that is restarted. Therefore, the data ingestion system (or a task node of the data ingestion system) can determine the limited portion of the common checkpoint data structure to analyze based at least in part on a failure time of the data ingestion system (or a task node of the data ingestion system), as well as the set time interval.

The fail time of a system or task can be determined in multiple ways, depending on the embodiment. In one embodiment, the system or task might have produced a log, such as an activity log that can be analyzed to determine a failure time. In other embodiments, the common checkpoint data structure can be analyzed to determine the last entry for any data source associated with the failed system or task. It can therefore be determined that the failed system or task was alive at least as of the time of this last entry. Once the time of this last entry is determined, then the portion of the common checkpoint data structure to be analyzed is only the portion corresponding to the set time interval before the time of that last entry, in some of these embodiments.

The system and method for dynamic task configuration without task restart can facilitate dynamic task configuration without restarting the tasks in a task cluster, in some embodiments. This dynamic task configuration can occur in a data ingestion system of data store, in some embodiments. The data store can be a distributed data store optimized for ingesting and processing streaming data, in some of these embodiments. In some embodiments, this distributed data store can be Apache Kafka.

In these task based systems, the task configuration might be distributed from a manager to individual tasks using an internal mechanism, and upon task start up each task receives its task configuration. For example, in some embodiments that constitute a data ingestion system of a data store, a task manager (such as a source connector in Apache Kafka) can orchestrate a number of tasks. In an example of a file system, where the file system is being imported into the data store, for example, a task manager might assign each subdirectory of a root directory to a different task. The task manager might create one task per each subdirectory, such that each task reads all the files in a particular subdirectory, in this example. However, in this example, if the file system is dynamic and a new subdirectory in the root directory is added, then a new task needs to be added, in some embodiments. At the very least, this new subdirectory needs to be assigned to an existing task. Therefore, dynamic data sources might create reconfiguration or reassignment issues for the task manager with regard to the tasks assigned to at least a portion of those data sources.

However, in some task-based systems, such as in Kafka for example, whenever a task configuration is altered (e.g. to rebalance logical source partitions amongst the tasks) all the tasks must be stopped and restarted. This can obviously incur a considerable delay in a large task cluster. In other words, to change the configuration of the tasks, or even to change the configuration of any one task, at least that task (and in some embodiments, all the tasks) must be stopped and restarted (or one or all new tasks created) with the new changed configurations. The configuration of each task is not dynamic in these embodiments, but is instead defined each time the task manager creates and/or restarts the tasks. In some embodiments, all the tasks must be stopped, be reconfigured, and then restarted (or at least one or even all new tasks created) in order for new configurations to take effect. This type of system environment can be referred to as "stop the world" in some embodiments.

The system and method for dynamic task configuration without task restart, in some embodiments, can support the task's assigned logical source shard/partitions using a side data structure, such as a shared task configuration data structure. In some embodiments the data structure might be a topic, and/or might be called a task-mapping-topic, such as in Kafka, for example. During task configuration, a task receives an identity. A task manager can retrieve information about the logical source partitions of data sources, in some embodiments, and create records with a name of the record as the task identifier, and with a value of the record as the logical source partitions of the data sources that are assigned to this task. These records are then put into the shared task configuration data structure, such as a task-mapping-topic, in some embodiments. This data structure can be log-compacted, in some of these embodiments, such that only the latest value for a given key (such as the task identifier) is used by the tasks. Therefore with the system and method for dynamic task configuration without task restart, new logical source additions and existing source deletions no longer requires task reconfiguration, and thus avoids a task complete shutdown-restart cycle, in some embodiments.

Referring back to the previous example where a task manager assigns each subdirectory of a root directory of a filesystem to a different task, the system and method for dynamic task configuration without task restart would handle this situation differently, in some embodiments. Instead of creating one task per subdirectory, and assigning that task to a different subdirectory of a root directory of a filesystem, the system and method for dynamic task configuration without task restart creates a fixed number of tasks, and assigns those tasks one or more subdirectories through the shared task configuration data structure. Thus each task might have a list of subdirectories to perform task actions on. However, the list of subdirectories assigned to any given task might change over time. For example, when a new subdirectory is added to the filesystem, the task manager will assign that new subdirectory to one of the tasks. However, the number of tasks will remain the same. This is because if the number of tasks changes, then the data ingestion system and/or the distributed data store might require all the tasks to be restarted. For example, with Apache Kafka, if any tasks are added or deleted, then a "stop the world" situation arises. Therefore, some embodiments of the system and method for dynamic task configuration without task restart allows for tasks to be reconfigured without having to "stop the world."

Thus, some embodiments of the system and method for dynamic task configuration without task restart can have multiple task nodes, where the task nodes can perform tasks in accordance with configurations assigned by a task manager. The task manager can, in some of these embodiments, assign new configurations to individual task nodes, create, for the task nodes, a record comprising the new configuration assigned to the task node along with a task node identifier of which task node it applies to, and add the created records for the task nodes to a shared task configuration data structure. A task node can then, in some of these embodiments, access (either at some kind of interval or whenever a record is added, for example) the shared task configuration data structure to identify a new record with its task node identifier, obtain the new record from the shared task configuration data structure, analyze the obtained new record to determine the new configuration that is assigned to itself, and configure itself in accordance with the new configuration, without having to restart either itself or any other task node.

The system and method for dynamic task configuration without task restart can use a task manager to safely assign any new logical source partitions to a task, in some embodiments. This assignment can be done by updating a task's identifier with additional logical source partitions of data sources, creating a record with the information, and putting that key-value record in the shared task configuration data structure (such as a task-mapping-topic), in some embodiments. Similarly, in order to delete an existing and/or assigned logical source partition from a task, the task manager can simply put a new record with the task's identifier as the key of the record, and with a modified value that removes the said logical source partition from the value list, in some embodiments.

In order to facilitate movement of data sources (or logical source partitions of data sources) between tasks, the system and method for dynamic task configuration without task restart can use a barrier scheme, in some embodiments. The task that is the current owner of the data source (or the logical source partition of the data source) can receive an update in the shared task configuration data structure akin to the delete source partition example mentioned above, in some embodiments. In some of these embodiments, the source task movement can be atomic to prevent any duplication of data. To ensure that the source task movement is atomic, the system and method for dynamic task configuration without task restart can enforce an acknowledgement from the previous owner task. This acknowledgement can be sent to a different data structure such as a shared task acknowledgement data structure, for example. This shared task acknowledgement data structure might be a topic in some embodiments. The previous owner task can send this acknowledgement to the shared task acknowledgement data structure after the previous owner task has successfully completed any outstanding records from the logical source partitions which are getting unassigned from it, in some embodiments. Once the task manager reads the acknowledgment from the shared task acknowledgement data structure, it can then follow the above-mentioned procedure for adding new logical source partition to let the new task take over, in some of these embodiments.

The task manager might implement such a barrier scheme in order to prevent the generation of duplicates, in some embodiments. Without the barrier scheme, a previous task might obtain data from source A, and a newly assigned task might also obtain start obtaining the same data from source A, since both tasks might be obtaining data from a same or similar offset at a same or similar time. Therefore, duplicates will be generated since two tasks will be reading the same data from the same source, in some of these embodiments. The task manager can implement the barrier scheme to ensure that the previous task has finished providing data to an output data stream and/or finished providing offsets to the common checkpoint data structure for source A. The acknowledgement can indicate to the task manager that the previous task has stopped reading and writing data for source A, and then the task manager can add that source to the new task which will take it over at some point.

Using the barrier scheme with the acknowledgement to create a barrier to coordinate when the task manager is moving a particular source from one task to another is a particular embodiment that may be needed for applications where a "write once" is needed to be guaranteed, but it may not apply to other situations. If "write once" does not need to be guaranteed, such that duplicates are acceptable, then the barrier scheme and/or the acknowledgement data structure do not need to be used and/or implemented, in these embodiments. In a "write at least once" case, the barrier scheme might be implemented in order to reduce the amount of duplicates, or it might not be implemented if the amount of duplicates from the data sources is not a concern, depending on the embodiment.

In order to facilitate the movement of data sources (or logical source partitions of data sources) between tasks, the task manager might obtain data, such as reporting or feedback from the tasks and/or the task nodes, in some embodiments. This data might be provided by the tasks or the task nodes to the task manager, or the task manager might retrieve or generate the data itself, depending on the embodiment. Therefore, the task manager can obtain this data, such as reporting or feedback from the tasks and/or the task nodes, and reconfigure the data sources among the task and/or task nodes, such as by using a load balancing algorithm, in some embodiments. With dynamic rebalancing, it is not necessary to know the load or input pattern at startup. With dynamic rebalancing, the initial assignment of sources to tasks is not definitive, and can be changed based on the task load. The initial assignment might be less than optimum, but the sources can be rebalanced among to the tasks without ever going through a down cycle, in order to provide a better task load distribution among the tasks and/or task nodes.

For example, suppose that a first task is obtaining data from sources A and B, and a second task is obtaining data from sources C and D. Further suppose that source A is an active data source, such that the first task cannot handle both sources A and B. The first task might report some metrics to the task manager or even send a request to the task manager to remove some of its assigned sources, in some embodiments. The task manager can then determine that sources A and B are too much for the first task to handle, in some embodiments. The task manager might determine which other task has less utilization, such that one of the sources, such as source B, can be moved from the first task to another task. In this example, the task manager might determine that the second task can support another source, and so might implement the above procedure to move source B from the first task to the second task.

In some embodiments, the data source might be a client or a customer of the data ingestion system and/or the streaming data store. In these embodiments, the clients or customers might be added or deleted on a regular basis, and/or the data traffic from individual clients or customers might be increasing or decreasing constantly. Therefore, it is very difficult if not impossible to know at one point in time the load from the clients or customers at a future point in time. Therefore, the task manager can obtain data, such as reporting or feedback from the tasks and/or the task nodes, and reconfigure the clients or customers among the task and/or task nodes, such as by using a load balancing algorithm, in some embodiments.

For system environments that can be referred to as "stop the world," there are some types of configuration changes that might still require a "stop the world" situation, in some embodiments. Some embodiments of the system and method for dynamic task configuration without task restart can forego a "stop the world" situation when assigning sources (or source partitions) to tasks and/or task nodes. However, for other types of confirmation changes, stopping and/or restarting the tasks might be required. For example, changing how much data tasks obtain from the data sources at one time might require the tasks to be stopped and/or restarted. As another example, changing how often to checkpoint progress points into the common checkpoint data structure for data sources, might also require the tasks to be stopped and/or restarted. There are other types of configuration changes that would not cause a restart, however, for task mapping for particular source partitions changes can be made by using the mechanism outlined in this disclosure to avoid the restart type configuration.

The shared task configuration data structure can be implemented in different ways, depending on the embodiment. In the embodiments that implement Kafka, the shared task configuration data structure can be implemented as a Kafka topic. The shared task configuration data structure can also be implemented as a database table, such as by a distributed database service, in some embodiments. The tasks can be implemented to check the database table for configuration updates, in some of these embodiments. The common checkpoint data structure can also be implemented as a table in a distributed database service. The shared task configuration data structure can also be implemented as a channel, such as through TNS or TCP, between the task manager and the tasks. The task acknowledgement data structure and common checkpoint data structure might be implemented by any persistent data store, in some embodiments.

The system and method for dynamic task configuration without task restart can also add or delete tasks and/or task nodes from use by changing their configuration, in some embodiments. The system might begin operation with more tasks and/or task nodes than are initially needed. The task manager can configure any tasks that are not initially needed as idle, in these embodiments. In the embodiments where the task manager assigns data sources to task nodes, the task manager might not assign any data sources to task nodes it wishes to be idle, for example. When the load of the tasks and/or task nodes that are in use increases to where another task and/or task node is needed, the task manager can reconfigure the idle tasks and/or task nodes to be active, in some embodiments. In the embodiments where the task manager assigns data sources to task nodes, the task manager might assign data sources to idle task nodes so that they become active, for example. If the load of the system decreases, the task manager might similarly configure additional tasks and/or task nodes to be idle, and reconfigure the remaining active tasks and/or task nodes to collectively handle the reduced load, in some embodiments.

Specific Embodiment for Faster Restart of Task Nodes Using Periodic Checkpointing of Data Sources FIG. 1 is a logical block diagram depicting faster restart of task nodes using periodic checkpointing of data sources comprising task nodes 100A-100N. The task nodes obtain 120A-120N data from data sources 110A-110N, store data source progress points for the data sources 130A-130N, execute tasks using the obtained data 160A-160N. The task nodes also checkpoint 140A-140N the data source progress points into a common checkpoint data structure 150, and retrieve 150A-150N the progress points during restart by analyzing only a limited portion 155 of the common checkpoint data structure 150, according to some embodiments.

In some embodiments, the task nodes 100A-100N, as well as any number of other possible services, operates as part of a service provider network (not shown in FIG. 1). However, the task nodes 100A-100N do not necessarily need to operate within a provider network, and can operate in a non-provider network client-server situation, or as simply software or an application running on one or more computers of a user or client, or in various other configurations that do not include provider networks, in some embodiments. In the embodiments that include a provider network, the services of the provider network can comprise one or more software modules executed by one or more electronic devices at one or more data centers and geographic locations, in some embodiments. Client(s) and/or edge device owner(s) using one or more electronic device(s) (which may be part of or separate from the service provider network) can interact with the various services of the service provider network via one or more intermediate networks, such as the internet. In other examples, external clients or internal clients can interact with the various services programmatically and without human involvement.

A provider network provides clients with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc.

The clients (or "customers") of provider networks may utilize one or more user accounts that are associated with a client account, though these terms may be used somewhat interchangeably depending upon the context of use. Clients and/or edge device owners may interact with a provider network across one or more intermediate networks (for example, the internet) via one or more interface(s), such as through use of application programming interface (API) calls, via a console implemented as a website or application, etc. The interface(s) may be part of, or serve as a front-end to, a control plane of the provider network that includes "backend" services supporting and enabling the services that may be more directly offered to clients.

To provide these and other computing resource services, provider networks often rely upon virtualization techniques. For example, virtualization technologies may be used to provide clients the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a client may directly utilize a compute instance (e.g., provided by a hardware virtualization service) hosted by the provider network to perform a variety of computing tasks. Additionally, or alternatively, a client may indirectly utilize a compute instance by submitting code to be executed by the provider network (e.g., via an on-demand code execution service), which in turn utilizes a compute instance to execute the code-typically without the client having any control of or knowledge of the underlying compute instance(s) involved.

As indicated above, service provider networks have enabled developers and other users to more easily deploy, manage, and use a wide variety of computing resources, including databases. The use of a database service, for example, enables clients to offload many of the burdens of hardware provisioning, setup and configuration, replication, clustering scaling, and other tasks normally associated with database management. A database service further enables clients to scale up or scale down tables' throughput capacity with minimal downtime or performance degradation, and to monitor resource utilization and performance metrics, among other features. Clients can easily deploy databases for use in connection with a wide variety of applications such as, for example, online shopping carts, workflow engines, inventory tracking and fulfillment systems, and so forth.

Referring back to FIG. 1, the task nodes 100A-100N might be implemented as part of a data ingestion system, in some embodiments. A data ingestion system of a distributed data store, such as source connectors in Kafka and/or Kafka Connect, provides data from a source to the distributed data store. The data ingestion system reads data from one location, and writes the data into a distributed data store. The data ingestion system can read from, for example, a file, a file system, a database, a data stream, an IoT device service, a log data service, a log storage service, are just some of many examples where data can be read from. In some of these embodiments, when data is written into the distributed data store, two different data structures are written to. One data structure can be the output data structure, where the actual data is written, and the other data structure can be a common checkpoint data structure 150, such as an offset data structure or an offset topic, that keeps track of the offset of the source.

For example, if data is being obtained from a data source 110A-110N, then the offset of the source is stored in the common offset data structure 150. If 100 items of data of a particular data source are obtained, as a further example, then those 100 data items of output will be produced to the output data structure. In addition, the number 100 might be written to the common checkpoint data structure 150 (along with an indicator of the particular file such as "Source A" or "Source B" in 150) to indicate that 100 lines have been read from that particular data source. If a task such as task 100N fails, then the task 100N might be restarted, in some embodiments. When the task is restarted, then the task 100N can analyze 150N a limited portion of the common checkpoint data structure 155 in order to resume from the appropriate data item of the appropriate sources. In the example shown in FIG. 1, Task Node N 100N is assigned Data Source M 110M and Data Source N 110N. During restart, Task Node N 100N retrieves 150N the latest progress points for those data sources from the limited portion of the common checkpoint data structure 155. In the example of FIG. 1, the latest progress point for Data Source N is 700 and the latest progress point for Data Source M is 75.

The individual task nodes 100A-100N can, therefore, read this common checkpoint data structure 150, such as an internal offset data structure and/or internal offset topic, to retrieve 150A-150N the checkpoint information for data sources 110A-110N upon restart, in some embodiments. The individual task nodes 100A-100N can keep track of where it is in the source data, such that during a restart it can then look at the common checkpoint data structure 150 in order to determine where to resume with the source data. In the embodiments where the distributed data store is Apache Kafka, Kafka provides and manages an internal offset topic to keep track of offset information for one or more connectors, such that if there is a restart, then that information is available for the one or more connectors to analyze and determine where they need to restart from.

When an offset is stored in the common checkpoint data structure 150, in some embodiments, it is stored along with an identifier of the source (such as a key) to which the offset pertains. For example, an identifier of a particular source along with the offset of that particular source is stored as one entry in the common checkpoint data structure 150. In some embodiments, all the offsets for all the data sources 110A-110N of all the task nodes are entered into the common checkpoint data structure 150.

When some additional information is read from that particular source, then an additional entry might be added to the common checkpoint data structure 150. For example, for a particular source A 110A, an entry of "100" might be included in the common checkpoint data structure 150 to show that 100 items of data were read from that source. Then when 200 items of data have been read, an entry of "200" might be added to the common checkpoint data structure 150 for that particular source.

Any particular source, such as source A 110A for example, might have multiple entries at different points in time in the common checkpoint data structure 150, in some embodiments. Source A (110A), for example, have multiple entries in the common checkpoint data structure (150) for "100", "200", "300", "400", "500", and "600" items of data that have been read from source A (110A). Each data source might have multiple, such as hundreds or thousands or millions, of entries in the common checkpoint data structure 150. With hundreds or thousands or millions of data sources 110A-110N being read from, the size of the common checkpoint data structure 150 can be very large. Furthermore, the size of the common checkpoint data structure 150 increases exponentially as either the number or sources 110A-110N or number of checkpoint entries per source increases. For example, the task nodes 100A-100N might be reading from a file system with a million files, which would mean a million different sources. If the task nodes are reading 100 lines per second from each file, and checkpoints after each second, then in 10 seconds there would be 10 million entries entered into the common checkpoint data structure 150.

However, only the latest entry for any given source 110A-110N is relevant at any given time. The previous entries for a source contain old offset data for that source which is no longer relevant. Since only the latest entry is relevant, then this common checkpoint data structure 150 can be log-compacted, in some embodiments. For example, in the embodiments that use Kafka, Kafka provides a way to compact the offset topic to keep only the latest entry for a given individual data source. However, the log compaction might happen infrequently, such as only once an hour for example. In addition, the log compaction might not happen with any certainty, and might only be implemented whenever system resources have lower usage to allow for a log compaction.

In the time between log compactions, however, the number of entries per data source in the common checkpoint data structure 150, and the size of the common checkpoint data structure 150 itself, might become very large. Depending on the frequency of any log compaction, the busyness of the tasks, and the number of unique items being check-pointed, the common checkpoint data structure might have a lot of entries to logically compact.

In addition, there might be no certainty about where the latest entry for any given data source 110A-110N might be located in the common checkpoint data structure 150. In other words, there is no guarantee that all the latest entries for all the corresponding data sources will be encountered in any given portion of the common checkpoint data structure. If the data source has been actively read from recently, then there will probably be a recent entry in the common checkpoint data structure for that source. In FIG. 1, data source B has been actively accessed recently, and therefore there are entries of "300" and "400" near the bottom of the common checkpoint data structure 150 for data source B 100B. However, if a data source has been inactive for a period of time, then the latest entry for that source might be in the beginning or somewhere in the middle of the common checkpoint data structure, in some embodiments. The latest entry of an inactive data source might be millions of records away from the latest entry of an active data source in the common checkpoint data structure, in some embodiments.

Any given restarted task node might be responsible for multiple data sources with different frequencies of activity. In order to find the latest entry for each of these data sources, a restarted task node 100N might have to analyze a large portion, if not all, of the common checkpoint data structure in order to retrieve entries for the individual corresponding data sources. If the common checkpoint data structure was a time ordered stack or log, for example, then the restarted system (or portion of the system) might have to start analyzing the end of the log (or stack), and analyze every entry from the end, until at least 1 entry for every corresponding data source is found in the common checkpoint data structure, in some embodiments.

The data ingestion service capable of faster restart of task nodes using periodic checkpointing of data sources can solve some of these as well as other problems, in some embodiments, by ensuring that each task node 100A-100N periodically checkpoints 140A-140N the logical-offset of the data sources to the common checkpoint data structure 150. This can be accomplished by a task node 100A-100N checkpointing one or more data source progress points, for each of the one or more data sources whose data is being used to perform the one or more tasks, into the common checkpoint data structure at least once every set time interval. The set time interval might be every 5 minutes, for example. Thus, multiple individual ones of the task nodes checkpoint data source progress points for multiple different ones of the plurality of data sources in the common checkpoint data structure. For example, task node 1 (100A) checkpoints data source progress points for data sources A, B, and C (110A, 110B, 110C) and task node N (100N) checkpoints data source progress points for data sources M and N (110M, 110N).

This checkpointing might be accomplished in multiple different ways, depending on the embodiment. The task node 100A-100N might only checkpoint 140A-140N data source progress points for inactive data sources, where entries have not been made for those inactive data sources during the previous time interval, in some embodiments. Thus, the task node might checkpoint at least one data source progress point for at least one data source into the common checkpoint data structure responsive to completion of a task where data is obtained from the at least one data source by the individual task node. In FIG. 1, for example, task node N 100N checkpoints "700" for data source N 110N after 700 data units have been obtained from data source N. In addition, a task node might checkpoint, at least once during the specific set time interval, a last data source progress point for another data source, even if no task was performed by the task node using data from the other data source during the specific set time interval, in some of these embodiments. In FIG. 1, for example task node N 100N checkpoints "75" for data source M (110M) once during the specific time interval, even though no data was obtained from data source M during that time interval.

In other embodiments, the task nodes might checkpoint data source progress points for all data sources every time interval, regardless of how active or inactive the data sources are. Thus, the task nodes might periodically checkpoint a last data source progress point, for each of the one or more data sources whose data is being obtained by the individual task node, into the common checkpoint data structure regardless of how recently data was obtained by the individual task node for each of the its data sources, in some of these embodiments.

In other embodiments, the task nodes might produce at least one output record during a set time interval for every data source corresponding to task node. These output records might either be genuine records coming from the data sources, or fake records when the source is not producing new records within the set time interval, in some embodiments. The fake records might carry proper metadata so that downstream consumers can ignore them safely, in some embodiments. The fake records might simply be null, in some embodiments. Therefore, the task nodes can provide a fake record for each of data sources whose data is being used to perform its tasks, to one or more output data streams of a streaming data store at least once every set time interval. The task nodes (100A-100N) can, responsive to the providing the fake record to the output data streams, checkpoint a last actual data source progress point into the common checkpoint data structure 150. As stated above, this fake record can comprise information indicating that downstream systems should ignore the fake record.

Upon restart of one or more task nodes (100A-100N), the common checkpoint data structure need not be read from the beginning, in some embodiments. Instead the task nodes can find the starting point (such as the sequence number) based on a time-stamp, in some of these embodiments. Since the data ingestion service capable of faster restart of task nodes using periodic checkpointing of data sources ensures that the tasks nodes checkpoint progress points of data sources within a previous time interval, in some embodiments, the task nodes just need to examine the common checkpoint data structure for the previous time interval 155, in these embodiments. The data ingestion service capable of faster restart of task nodes using periodic checkpointing of data sources will ensure that there is at least one entry in the common checkpoint data structure for all corresponding data sources (110A-110N) during this previous time interval. Some active data sources will have more than one entry during this previous time interval, such as data source B 110B having more than one entry in the limited portion 155, but some inactive data sources will only have one entry in the common checkpoint data structure during this time interval. However, each entry should have at least one entry in the common checkpoint data structure during this time interval.

Thus, after restart, a particular task node can perform a determination of where to resume obtaining data from the data sources whose data is being obtained by the particular task node. In order to perform this determination, the task node (100N for example) can determine a limited portion of the common checkpoint data structure (155) based on the set time interval, can analyze the limited portion of the common checkpoint data structure (155), without analyzing the remainder of the common checkpoint data structure, and can retrieve (150N), from the limited portion of the common checkpoint data structure (155), the one or more data source progress points for the one or more data sources (110M, 110N) whose data is being obtained by the particular task node (100N). After retrieving the data source progress points, the task node (100N) can resume obtaining data (120N) from the data sources (110M, 110N) based at least in part on the retrieved data source progress points, in order to resume performing the tasks (160N) using the data from the one or more data sources.

The common checkpoint data structure 150 can be ordered by time, in some embodiments. In some of these embodiments, the common checkpoint data structure can be accessed by the times the entries were created. For example, the task nodes can access the common checkpoint data structure starting either with the latest record in the common checkpoint data structure, or the earliest record, or it can start reading at records before or after a given timestamp, in some of these embodiments. Therefore, if the set time interval were 5 minutes, for example, then just the entries of the common checkpoint data structure for the last 5 minutes might can be accessed, in some embodiments. In the embodiments where the distributed data store is Apache Kafka, Kafka lets tasks read from its offset topic by timestamp, for example. Kafka provides a mechanism that allows its offset topic to be accessed at a starting location that corresponds to the record created closest to a given timestamp. Once a starting location of the offset topic is determined, then the offset topic can be accessed sequentially, starting from that starting location, in some embodiments.

In some other embodiments the task nodes might examine the common checkpoint data structure for a previous time interval plus a grace or buffer period, where the grace period might be the time for a task restart for example. If checkpointing of the data sources occurs at least once during the previous time interval, and if it takes a certain amount of restart time to restart a data ingestion system (or a task node of the data ingestion system) then the limited portion of the common checkpoint data structure 155 to analyze would be the portion that encompasses at least the past time interval plus the task restart time. Since the task restart time might vary, a sufficient grace period can be added to the set time interval that is large enough to accommodate all (or at least most of) the task restart times, in some embodiments.

The task nodes might further tighten the uncertainty of the time window corresponding to the limited portion of the common checkpoint data structure 155 to be analyzed, by deducing the last system or task crash time, and using this time to only examine a further limited portion of the internal offset data structure. If it is known that a task node (100N for example) failed at a certain fail time, then the limited portion of the common checkpoint data structure 155 to analyze is the portion corresponding to the set time interval that ends at the fail time. For example, if it is known that a task node failed at 2 pm, and if the set time interval is 5 minutes (such that all data sources are checkpointed at least once every five minutes), then the records of the common checkpoint data structure to be analyzed for the restart of that task node are only the records that were created from 1:55 pm until 2 pm. The remaining portion of the common checkpoint data structure does not need to be analyzed in these embodiments. Only the portion of the common checkpoint data structure corresponding to the set time interval before the fail time of the system or task that is restarted. Therefore, restarted task node N (100N), for example, can determine the limited portion of the common checkpoint data structure 155 to analyze based at least in part on a failure time of previous task node N, as well as the set time interval.

The fail time of a system or task can be determined in multiple ways, depending on the embodiment. In one embodiment, the system or task might have produced a log, such as an activity log that can be analyzed to determine a failure time. In other embodiments, the common checkpoint data structure can be analyzed to determine the last entry for any data source associated with the failed system or task. It can therefore be determined that the failed system or task was alive at least as of the time of this last entry. Once the time of this last entry is determined, then the portion of the common checkpoint data structure to be analyzed is only the portion corresponding to the set time interval before the time of that last entry, in some of these embodiments.

Specific Embodiment for Dynamic Task Configuration Without Task Restart

Figure 2:
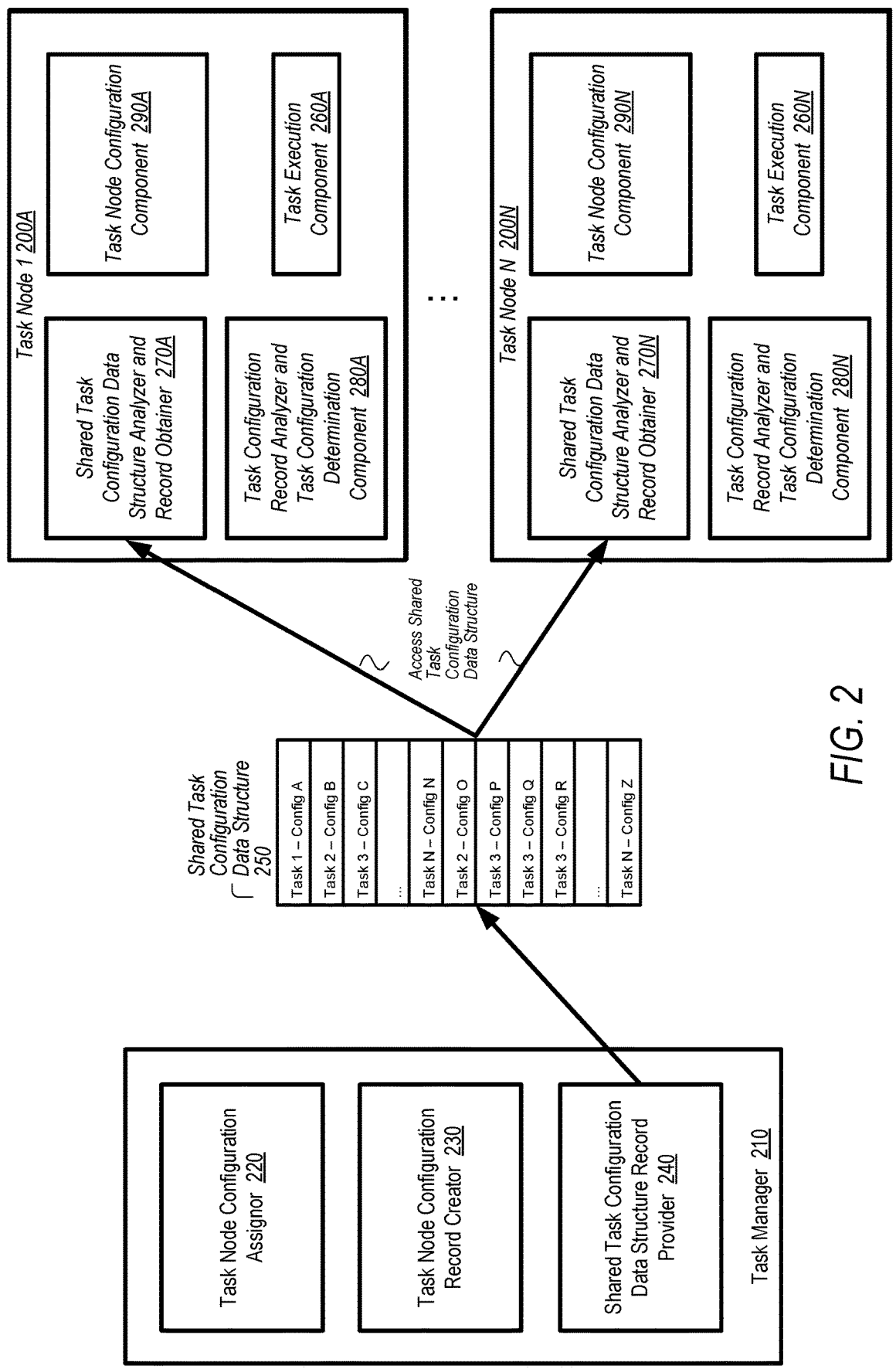
FIG. 2 is a logical block diagram depicting dynamic task configuration without task restart comprising a task manager that assigns configurations to task nodes, creates records with the configurations for the task nodes, and provides the records to a shared task configuration data structure, and task nodes that analyze the shared task configuration data structure, obtain records corresponding to the task nodes, analyze the records, determine the assigned configuration, apply the assigned configuration, and execute the appropriate tasks, according to some embodiments.

FIG. 2 is a logical block diagram depicting dynamic task configuration without task restart comprising a task manager 210 and task nodes 200A-200N. The task manager 210 assigns configurations to task nodes in a task node configuration assignor 220, creates records with the configurations for the task nodes in a task node configuration record creator 230, and provides the records to a shared task configuration data structure 250 in a shared task configuration data structure record provider 240. The task nodes 200A-200N analyze the shared task configuration data structure 250 in a shared task configuration data structure analyzer and record obtainer 270A-270N, obtain records corresponding to the task nodes, analyze the records in a task configuration record analyzer and task configuration determination component 280A-280N, determine the assigned configuration, and apply the assigned configuration in a task node configuration component 290A-290N. The task nodes 200A-200N can also execute 260A-260N the appropriate tasks, in some embodiments.

As stated previously, in some task-based systems, such as in Kafka for example, whenever a task configuration is altered (e.g. to rebalance logical source partitions amongst the tasks) all the task nodes must be stopped and restarted. This can obviously incur a considerable delay in a large task cluster. In other words, to change the configuration of the task nodes, or even to change the configuration of any one task, at least that task node (and in some embodiments, all the task nodes) must be stopped and restarted (or one or all new task nodes created) with the new changed configurations. The configuration of each task is not dynamic in these embodiments, but is instead defined each time the task manager creates and/or restarts the task nodes. In some embodiments, all the task nodes must be stopped, be reconfigured, and then restarted (or at least one or even all new task nodes created) in order for new configurations to take effect. This type of system environment can be referred to as "stop the world" in some embodiments.

The system for dynamic task configuration without task restart as shown in FIG. 2, in some embodiments, can support a task node's (200A-200N) assigned configuration using a side data structure, such as a shared task configuration data structure 250. In some embodiments the data structure might be a topic, and/or might be called a task-mapping-topic, such as in Kafka, for example. During task configuration, a task receives an identity. A task manager 210 can retrieve information about task node configurations, in some embodiments, can assign 220 configurations to task nodes, and can create 230 records with a name of the record as the task node identifier, and with a value of the record as the configuration for that task node. These records are then provided 240 to the shared task configuration data structure 250, such as a task-mapping-topic, in some embodiments. This data structure can be log-compacted, in some of these embodiments, such that only the latest value for a given key (such as the task node identifier) is used by the task nodes. Therefore, with the system and method for dynamic task configuration without task restart, new configurations no longer require a complete shutdown-restart cycle, in some embodiments.

FIG. 2 shows multiple task nodes 200A-200N, where the task nodes can perform tasks 260A-260N in accordance with configurations assigned 220 by a task manager 210. The task manager 210 can, in some of these embodiments, assign 220 new configurations to individual task nodes, create 230, for the task nodes, a record comprising the new configuration assigned to the task node along with a task node identifier of which task node it applies to, and add 240 the created records for the task nodes to a shared task configuration data structure 250. A task node can then, in some of these embodiments, access 270A-270N (either at some kind of interval or whenever a record is added, for example) the shared task configuration data structure 250 to look for a new record with its task node identifier, obtain 270A-270N the new record from the shared task configuration data structure 250, analyze 280A-280N the obtained new record to determine the new configuration that is assigned to itself, and configure 290A-290N itself in accordance with the new configuration, without having to restart either itself or any other task node 200A-200N.

For system environments that can be referred to as "stop the world," there are some types of configuration changes that might still require a "stop the world" situation, in some embodiments. The task manager 210 can forego a "stop the world" situation when assigning some configurations to tasks and/or task nodes. However, for other types of confirmation changes, stopping and/or restarting the tasks might be required. For example, changing how much data tasks obtain from the data sources at one time might require the task nodes to be stopped and/or restarted. As another example, changing how often to checkpoint progress points into the common checkpoint data structure for data sources, might also require the task nodes to be stopped and/or restarted. However, changes in mapping particular sources to particular task nodes, for example, can be made by using the mechanism outlined in this disclosure to avoid the restart type configuration.

The shared task configuration data structure 250 can be implemented in different ways, depending on the embodiment. In the embodiments that implement Kafka, the shared task configuration data structure can be implemented as a Kafka topic. The shared task configuration data structure can also be implemented as a database table, such as by a distributed database service, in some embodiments. The task nodes 200A-200N can be implemented to check the database table for configuration updates, in some of these embodiments. The common checkpoint data structure 250 can also be implemented as a table in a distributed database service. The shared task configuration data structure can also be implemented as a channel, such as through TNS or TCP, between the task manager 210 and the task nodes 200A-200N.

The task manager 210 can also add or delete task nodes from use by changing their configuration, in some embodiments. The task manger might begin operation with more task nodes that are initially needed. The task manager 210 can configure any task nodes that are not initially needed as idle, in these embodiments. When the load of the task nodes that are in use increases to where another task node is needed, the task manager can reconfigure the idle task nodes to be active, in some embodiments. If the load of the system decreases, the task manager 210 might similarly configure additional task nodes to be idle, and reconfigure the remaining active task nodes to collectively handle the reduced load, in some embodiments.

Figure 3:
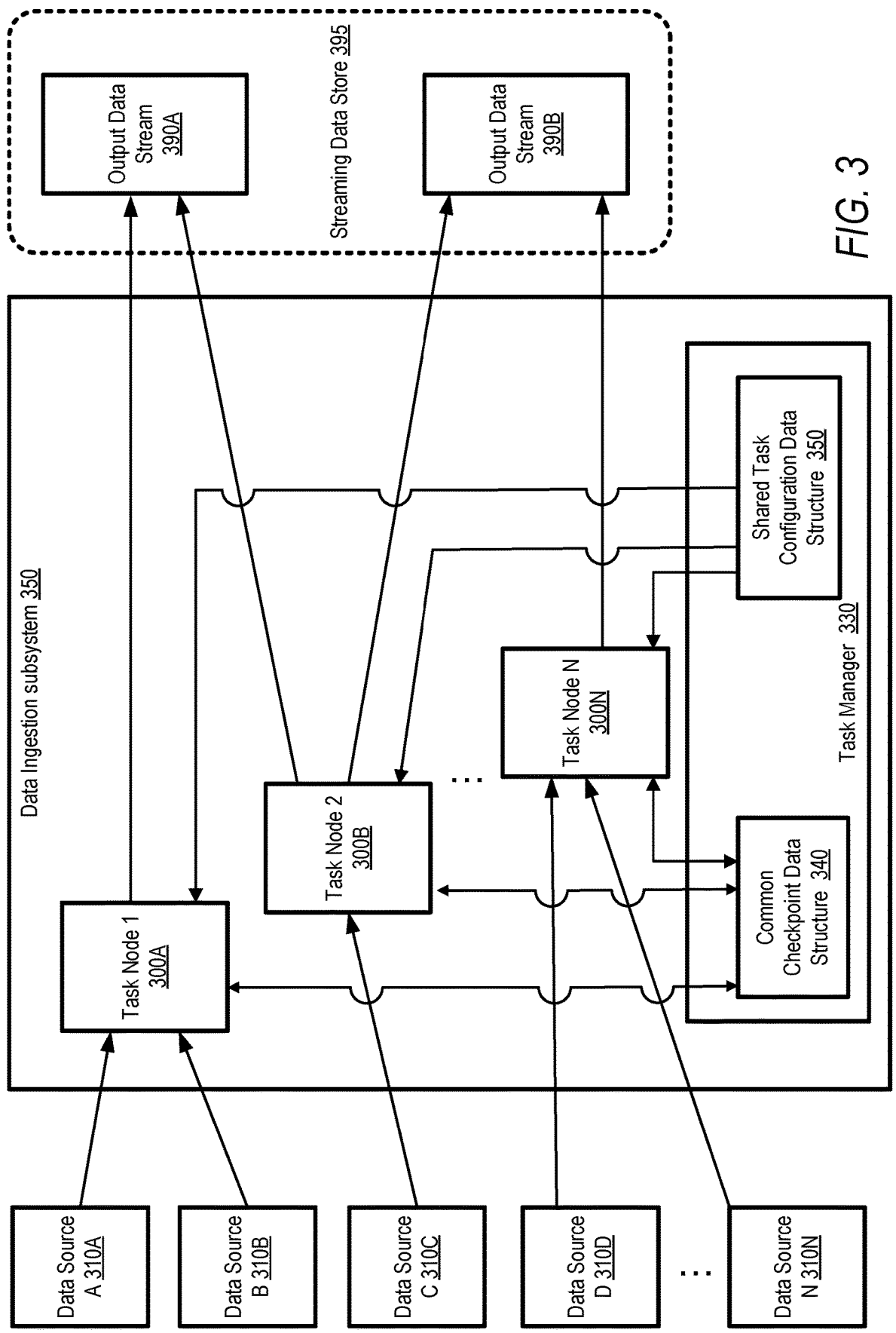
FIG. 3 is a logical block diagram illustrating a task manager and a plurality of task nodes of a data ingestion subsystem, where the task nodes obtain data from data sources and output data to output data streams of a streaming data store, where the task nodes also checkpoint progress points into a common checkpoint data structure of the task manager, and obtain records from a shared task configuration data structure corresponding to the task nodes, according to some embodiments.

Specific Embodiments of Both Faster Restart of Task Nodes Using Periodic Checkpointing of Data Sources and Dynamic Task Configuration Without Task Restart FIG. 3 is a logical block diagram illustrating a task manager 330 and a plurality of task nodes 300A-300N of a data ingestion subsystem 350. The task nodes 300A-300N obtain data from data sources 310A-310N and output data to output data streams 390A-390B of a streaming data store 395. The task nodes 300A-300N also checkpoint progress points into a common checkpoint data structure 340 of the task manager 330, as explained with regard to FIG. 1 above. The task manager 330 can, in some of these embodiments, assign data sources to individual task nodes, create, for the task nodes, a record comprising the data sources assigned to the task node along with a task node identifier of which task node it applies to, and add the created records for the task nodes to the shared task configuration data structure 350. A task node 300A-300N can then, in some of these embodiments, access (either at some kind of interval or whenever a record is added, for example) the shared task configuration data structure 350 to look for a new record with its task node identifier, obtain the new record from the shared task configuration data structure 350, analyze the obtained new record to determine the data sources it is assigned to, and start obtaining data from those assigned data sources, without having to restart either itself or any other task node 300A-300N. In FIG. 3, Task Node 1 300A is assigned Data Source A 310A and Data Source B 310B. Task Node 2 300B is assigned Data Source C 310C. Task Node N 300N is assigned Data Source D 310D and Data Source N 310N.

The task manager 330 assigns those task nodes (300A-300N) one or more data sources (310A-310N) through the shared task configuration data structure 350. Thus, each task node (300A-300N) might have one or more data sources to perform task actions on. However, the list of data sources assigned to any given task node might change over time. For example, when a new data source is added, the task manager will assign that new data source to one of the task nodes. However, the number of task nodes will remain the same. This is because if the number of task nodes changes, then the data ingestion subsystem 350 and/or the distributed data store 395 might require all the task nodes (300A-300N) to be restarted. For example, with Apache Kafka, if any tasks are added or deleted, then a "stop the world" situation arises. However, the embodiment shown in FIG. 3 allows for task nodes (300A-300N) to be reconfigured using the shared task configuration data structure 350 without having to "stop the world."

The task manager 330 can safely assign any new data source to a task node, in some embodiments. This assignment can be done by updating a task node's identifier with additional data sources, creating a record with the information, and putting that key-value record in the shared task configuration data structure 350, in some embodiments. Similarly, in order to delete an existing and/or assigned data source from a task node, the task manager 330 can simply put a new record in the shared task configuration data structure 350 with the task node's identifier as the key of the record, and with a modified value that removes the said data source from the value list, in some embodiments.

Figure 4:
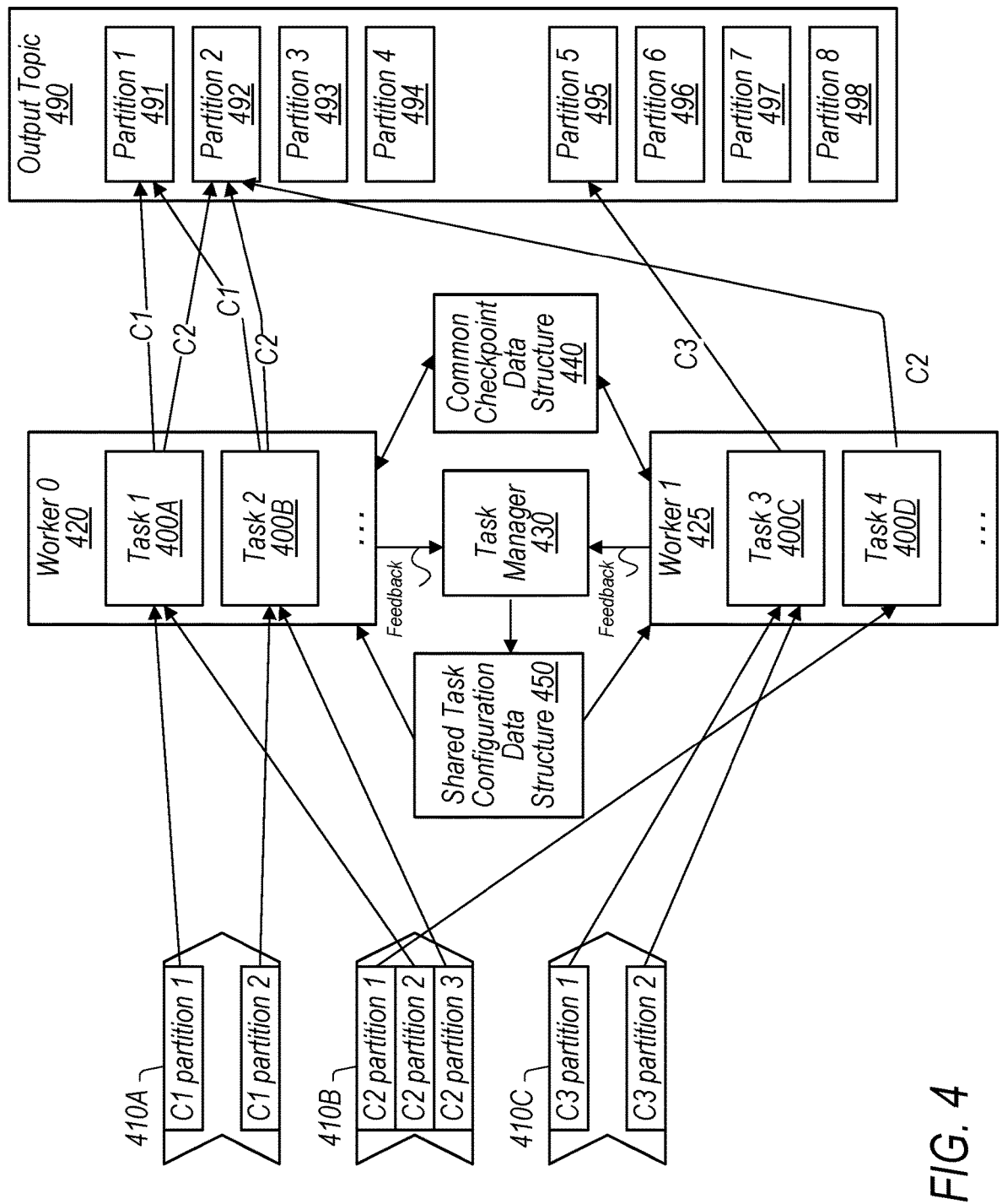
FIG. 4 is a logical block diagram illustrating a plurality of workers executing a plurality of tasks, where the tasks obtain data from partitions of data sources and publish the data to various partitions of an output topic, and where the task manager receives feedback from the workers and provides configuration records to a shared configuration data structure, and where the workers or tasks checkpoint progress points of the input partitions to the common checkpoint data structure, according to some embodiments.

FIG. 4 is a logical block diagram illustrating a plurality of workers 420, 425 executing a plurality of tasks 400A, 400B, 400C, and 400D. The tasks (400A, 400B, 400C, and 400D) obtain data from partitions of data sources (410A, 410B, 410C) and publish the data to various partitions (491-498) of an output topic 490. The task manager 430 receives feedback from the workers (420, 425) and provides configuration records to a shared configuration data structure 450. The workers or tasks checkpoint progress points of the input partitions to the common checkpoint data structure 440, in some embodiments. The workers or tasks retrieve the progress points during restart by analyzing only a limited portion of the common checkpoint data structure 440, according to some embodiments.

The tasks read from multiple data sources C1 (410A), C2 (410B), and C3 (410C), where each source is divided into partitions. The process of assigning source partitions to tasks can be called lease management. In some embodiments, this process can be capable of assigning the source partitions in order to avoid hot tasks, while rebalancing the assignation as new sources or partitions are created (such as by customers or traffic pattern changes). To avoid hot tasks, the number of source partitions assigned to a task may not as important as the volume generated by each source partition, in some embodiments.

In FIG. 4, the source partitions are mapped to tasks, and the tasks to workers. C1 partition 1 and C2 partition 2 are mapped to Task 1 (400A). C1 partition 2 and C2 partition 3 are mapped to Task 2 (400B). C3 partitions 1 & 2 are mapped to task 3 (400C). Finally, C2 partition 1 is mapped to Task 4 (400D). Task 1 (400A) and Task 2 (400B) are executed on worker 0 (420). Task 3 (400C) and Task 4 (400D) are executed on worker 1 (425). The tasks act as producers to publish records to different partitions of the output topic 490.

Most of the different types of data sources (410A, 410B, 410C) are divided into partitions which store the data in order. Some embodiments of a task manger preserve the order per partition and to guarantee exactly-once transfer. To be able to preserve the order per partition and to guarantee exactly-once transfer, each partition needs to be assigned to only one task, but one task can process multiple partitions. If there are many different source partitions, it's usually not possible to create one task per source partition as a task is not a light resource, in some embodiments. Therefore, the task job is multiplexed to be able to read from multiple source partitions in parallel, in some of these embodiments. In some embodiments, it's usually not possible to assign all source partitions of one delivery stream to one task. While that implementation would mean a simple process of creating and mapping one task per source, it is harder to achieve a balanced distribution of load across tasks and makes it not possible to support clients or customers who produce a large volume of data in one delivery stream that is divided in multiple partitions.

Figure 5:
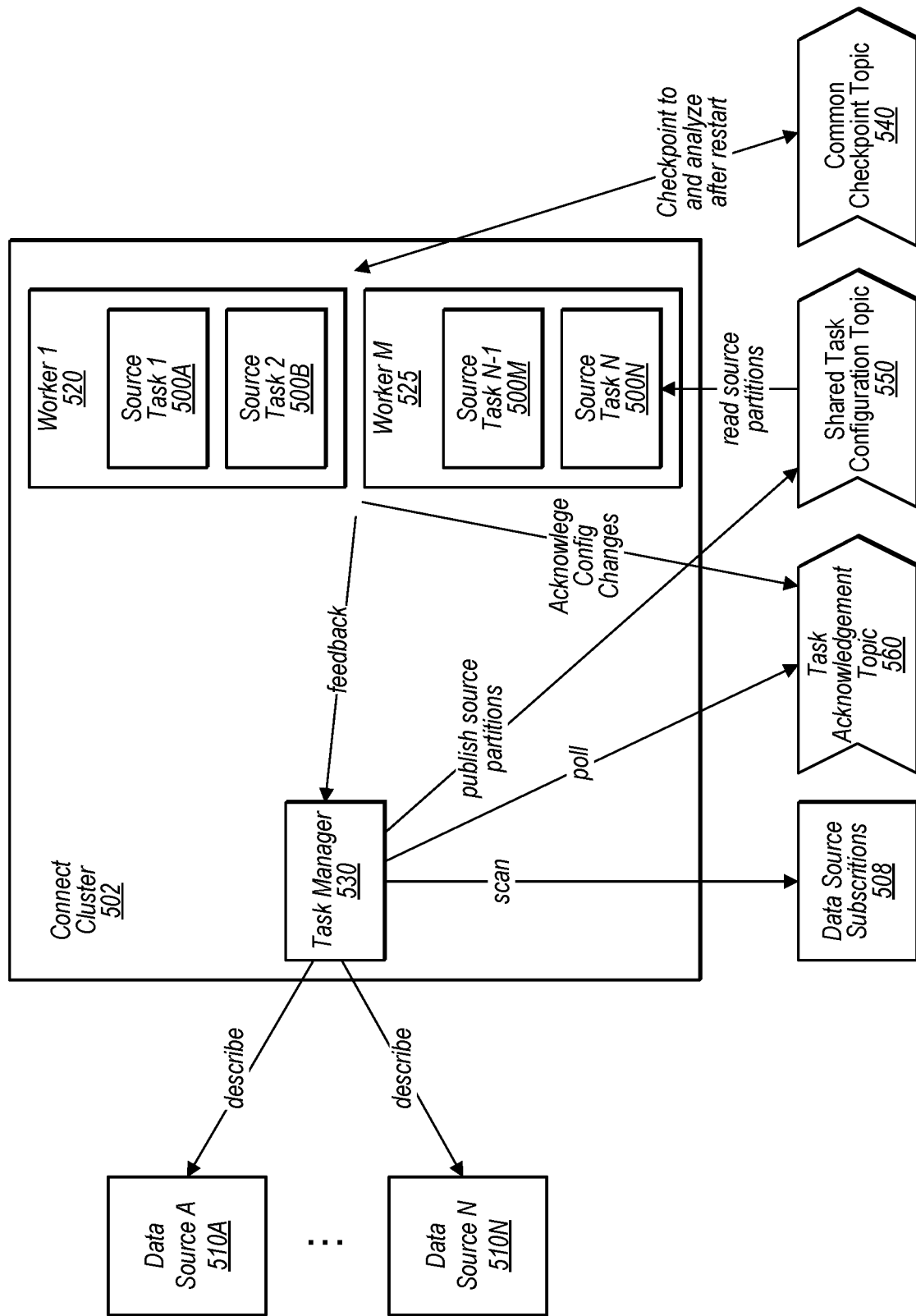
FIG. 5 is a logical block diagram depicting a connect cluster to a data store, where the connect cluster comprises a task manger and a plurality of workers, where each worker executes one or more source tasks, where the task manager scans the data source subscriptions to determine the sources that apply to the connect cluster, describe the sources in order to discover the partitions of the sources, and then publishes source partitions to the shared task configuration topic which the source tasks analyze to discover the source partitions applied to them, where the source tasks acknowledge configuration changes to the task acknowledgement topic, provide feedback to the task manager, and checkpoint progress points to the common configuration topic which they then analyze after a restart, according to some embodiments.

FIG. 5 is a logical block diagram depicting a connect cluster 502 to a data store, such as a streaming data store. The connect cluster 502 comprises a task manger 530 and a plurality of workers (520, 525). Each worker executes one or more source tasks (500A, 500B, 500M, and 500N). The task manager 530 scans the data source subscriptions 508 to determine the sources that apply to the connect cluster 502. The task manager 530 describes the data sources (510A, 510N) in order to discover the partitions of the data sources, and then publishes source partitions to the shared task configuration topic 550. The source tasks (500A, 500B, 500M, and 500N) analyze the shared task configuration topic 550 to discover the source partitions applied to them. The source tasks (500A, 500B, 500M, and 500N) acknowledge configuration changes to the task acknowledgement topic 560. The source tasks (500A, 500B, 500M, and 500N) also provide feedback to the task manager 530. The source tasks (500A, 500B, 500M, and 500N) also checkpoint progress points to the common checkpoint topic 540 which they then analyze after a restart, in some embodiments.

In FIG. 5, each a connect cluster 502 guarantees one instance of the task manager 530 across workers (520, 525) and multiple tasks (500A-500N) running in the cluster divided in the workers. In the embodiments where the connect cluster is a Kafka connect cluster, the task manager 530 can be a source connector. The task manger 530 is configured with the max number of tasks to create, and assigns an id to each task (500A-500N). The connect cluster 502 can run the task manger 530 in one single worker, and in case of failure it can automatically move the task manager to another worker (avoiding single point of failure) recovering the task manger after a worker crash.

The task manager 530 reads all subscriptions for the specific connect cluster from a data source partitions 508 source. For each fetched source, the task manger 530 describes the data source (510A-510N) to discover the partitions. The task manger 530 also listens to push notifications from the data source subscriptions 508 source to list changes in the subscriptions. Once all partitions from a source are known, the task manager 530 needs to assign the partitions to different tasks (500A-500N). The partitions have to be distributed into many tasks as some sources could be bigger than what a single task can process. One way to balance the tasks, in some embodiments, is to use a consistent hashing function using the sourceId and partitionId as the seed. As this process is centralized in the task manger, a more complex lease management can also be implemented, in other embodiments, by assigning partitions based on some weights to balance which partitions are processed by each task (for example: the weights are based on stats of bytes/records generated by the source partition in the past). Some embodiments implement a random assignment or any algorithm with a greedy heuristic. In these embodiments it's not necessary to wait until all sources are described, and assignment can happen as soon as the describe operation finishes. It's also possible to use the dynamic rebalancing mechanism to avoid hot tasks (tasks which are in charge of processing heavy source partitions).

In order to facilitate movement of data sources (510A-510N) between tasks (500A-500N), the task manager 530 can use a barrier scheme, in some embodiments. The task that is current owner of the data source can receive an update in the shared task configuration topic 550 akin to a delete source partition example described above, in some embodiments. If the source task movement should be atomic, the task manager 530 can enforce an acknowledgement from the previous owner task. This acknowledgement can be sent to a different data structure such as a task acknowledgement topic 560, for example. The existing task can send this acknowledgement to the shared task acknowledgement topic 560 after the existing task has successfully completed any outstanding records from the data source which is getting unassigned from it, in some embodiments. Once the task manager 530 reads the acknowledgment from the shared task acknowledgement topic 550, it can then follow the above described procedure for adding a new data source to let the new task take over, in some of these embodiments.

The task manager might implement such a barrier scheme in order to prevent the generation of duplicates, in some embodiments. Without the barrier scheme, a previous task might obtain data from source A 510A, and a newly assigned task might also obtain start obtaining the same data from source A, since both tasks might be obtaining data from a same or similar offset at a same or similar time. Therefore, duplicates will be generated since two tasks will be reading the same data from the same source, in some of these embodiments. The task manager 530 can implement the barrier scheme to ensure that the previous task has finished providing data to an output data stream and/or finished providing offsets to the common checkpoint topic 540 for source A. The acknowledgement can indicate to the task manager 530 that the previous task has stopped reading and writing data for source A 510A, and then the task manager 530 can add that source to the new task which will take it over at some point.

Using the barrier scheme with the acknowledgement to coordinate when the task manager is moving a particular source from one task to another is a particular embodiment that may be needed for applications where a "write once" is needed to be guaranteed, but it may not apply to other situations. If "write once" does not need to be guaranteed, such that duplicates are acceptable, then the barrier scheme and/or the acknowledgement topic do not need to be used and/or implemented, in these embodiments. In cases where duplicates are acceptable, the barrier scheme might still be implemented in order to reduce the amount of duplicates, or it might not be implemented if the amount of duplicates from the data sources is not a concern, depending on the embodiment.

In order to facilitate the movement of data sources (or logical source partitions of data sources) between tasks, the task manager 530 might obtain data, such as reporting or feedback from the tasks (500A-500N) and/or the workers (520, 525), in some embodiments. This data might be provided by the tasks or the workers to the task manager 530, or the task manager might retrieve or generate the data itself, depending on the embodiment. Therefore, the task manager 530 can obtain this data, such as reporting or feedback from the tasks and/or the workers, and reconfigure the data sources among the task and/or workers, such as by using a load balancing algorithm, in some embodiments. With dynamic rebalancing, it is not necessary to know the load or input pattern at startup. With dynamic rebalancing, the initial assignment of sources to tasks is not definitive, and can be changed based on the task load. The initial assignment might be less than optimum, but the sources (510A-510N) can be rebalanced among to the tasks (500A-500N) without ever going through a down cycle, in order to provide a better task load distribution among the tasks and/or workers.

For example, suppose that Task 1 500A is obtaining data from sources A 510A and B (not shown), and Task N-1 (500M) is obtaining data from sources M (not shown) and N (510N). Further suppose that source A (510A) is an active data source, such that Task 1 (500A) cannot handle both sources A and B. Task 1 might report some metrics to the task manager 530 or even send a request to the task manager to remove some of its assigned sources, in some embodiments. The task manager can then determine that sources A and B are too much for Task 1 to handle, in some embodiments. The task manager might determine which other task has less utilization, such that one of the sources, such as source B, can be moved from Task 1 to Task M. In this example, the task manager might determine that Task M can support another source, and so might implement the above procedure to move source B from Task 1 to Task M.

In some embodiments, the data source might be a client or a customer of the connect cluster 502. In these embodiments, the clients or customers might be added or deleted on a regular basis, and/or the data traffic from individual clients or customers might be increasing or decreasing constantly.

Therefore, it is very difficult if not impossible to know at one point in time the load from the clients or customers at a future point in time. Therefore, the task manager 530 can obtain data, such as reporting or feedback from the tasks and/or workers, and reconfigure the clients or customers among the task and/or workers, such as by using a load balancing algorithm, in some embodiments.

Figure 6:
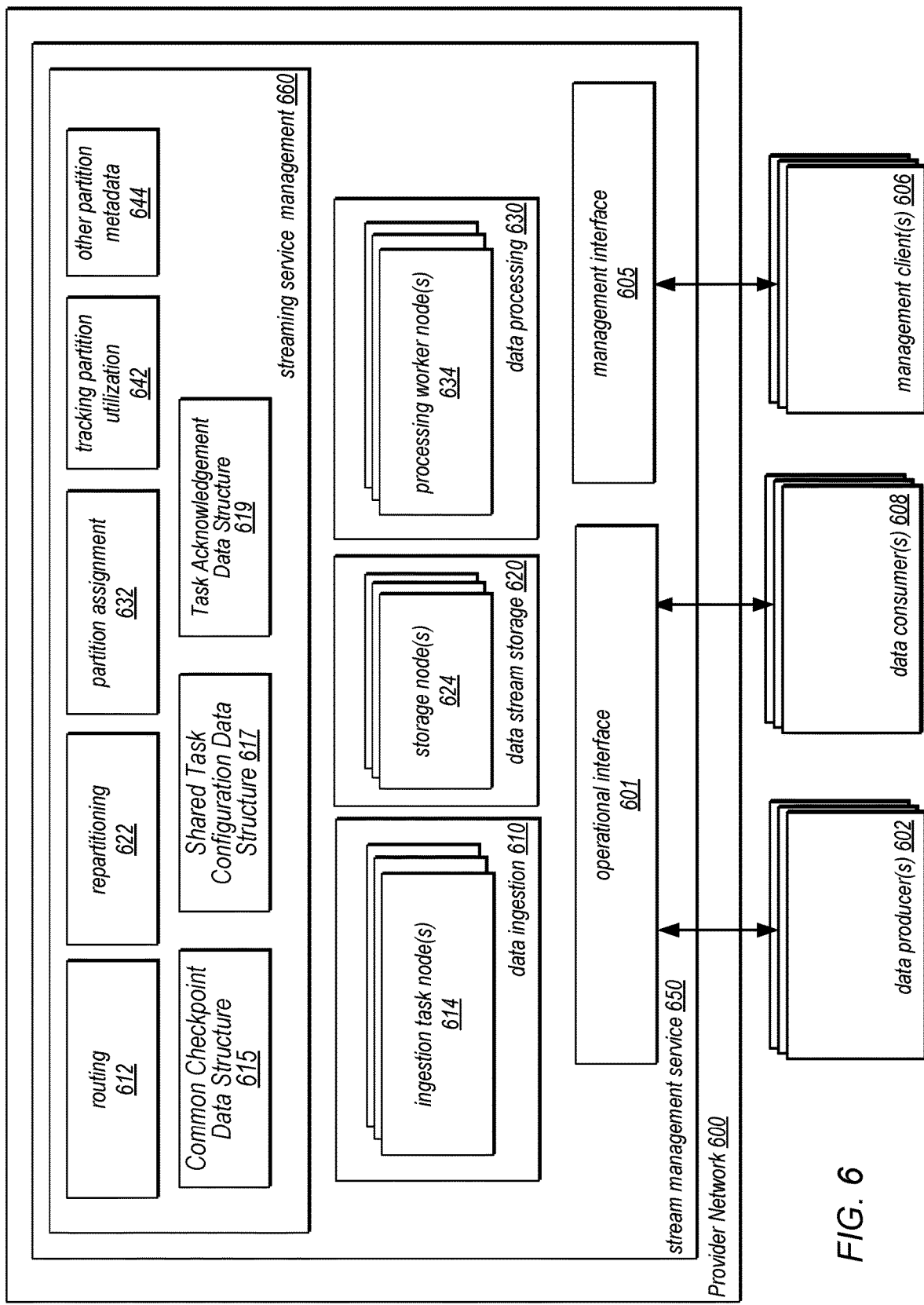
FIG. 6 is a logical block diagram of a streaming data service of a provider network that interfaces to management clients for configuration, and data producers and data consumers for its operation, where the streaming data service comprises ingestion task nodes for data ingestion, storage nodes for data stream storage, processing worker nodes for data processing, and a streaming data service management system that comprises routing, repartitioning, partition assignment, tracking partition utilization, and other partition metadata components, as well a common checkpoint data structure, a shared task configuration data structure, and a task acknowledgement data structure, according to some embodiments.

FIG. 6 is a logical block diagram of a stream management service 650 of a provider network 600. The stream management service ("SMS") interfaces to management client(s) 606 for configuration through a management interface 605, and data producer(s) 602 and data consumer(s) 608 for its operation through an operational interface 601. The stream management service 600 comprises ingestion task nodes 614 for data ingestion 610, storage nodes 624 for data stream storage 620, and processing worker nodes 634 for data processing 630. The stream management service 600 also comprises a streaming data service management system 660 that comprises routing 612, repartitioning 622, partition assignment 632, tracking partition utilization 642, and other partition metadata components 644, as well a common checkpoint data structure 615, a shared task configuration data structure 617, and a task acknowledgement data structure 619, according to some embodiments.

Stream management service 650 may ingest data from one or multiple sources 602 for a data stream, store the data in the data stream 620 and provide access to the data for service-provided consumers or processors of the data or externally located (with respect to stream management service) consumers or processors 608 of the data. As illustrated in FIG. 6, data ingestion 610, data stream storage 620, data processing 630, may implement such functionality on behalf of SMS 650. Data producer(s) 602, management client(s) 606, and data consumer(s) 608, may interact with SMS 650 via interfaces 601 & 605. Streaming data service management 660 may manage the provisioning, operation, networking, and other operations of the various systems in SMS 650 (e.g., provisioning and/or configuring ingestion nodes(s) 614, storage node(s) 624, and processing worker node(s) 634.

Data ingestion system 610 may include one or more nodes 614 or components to ingest data. The data ingestion system 610 can be the data ingestion subsystem 350 of FIG. 3 in some embodiments. Nodes 614 of the ingestion system 610 may be configured (e.g., by nodes implementing streaming data service management 660) to obtain data records of a particular data stream from data producers 602. Ingestion nodes 614 may obtain the data records according to a scheme for partitioning the data stream. In some embodiments, the partitioning scheme may be selected by a client of SMS 650 for a data stream such that data records are received from data producer(s) 602 indicating the particular partition to which the data record belongs (e.g., by including a partition key as discussed above). Such data records may be directed to those ingestion node(s) 614 responsible for the particular partition (e.g., nodes assigned to the partition by partition assignment 632). However, even in such cases, dynamic management of data streams may be implemented to provide a different underlying partition of the data stream than is specified by the client so that routing system 612 may make routing decisions to the underlying partitions based on partition utilization data maintained for the underlying partitions of the data stream.

In some embodiments, a data stream may be fully managed by SMS 650 and data producer(s) 602 may send data records without any direction for partitioning (e.g., with no partitioning key). Data ingestion system 610 (in accordance with decisions performed by routing system 612) may identify a partition of the data stream in order to route the data records to ingestion node(s) 614 for the identified partition (e.g., by assigning a partition key to a data record that corresponds to the partition to which the data record is to be routed). In this way, partition utilization information (which may be tracked by partition utilization tracking 642) may inform routing decisions to ensure that each partition of a data stream is fully utilized. Then ingestion nodes 614 may pass obtained data records on to corresponding storage nodes 624 (provisioned for a partition of the data stream according to partition assignment system 632) of the data stream storage system 620. Storage node(s) 624 may record, save, store or otherwise persist the data records on any of various types of storage devices (which may be performed in accordance with a persistence policy for the data stream).

In order to process the data stream, processing worker node(s) 634 of data processing system 630 may access the storage node(s) 634 corresponding to a partition assigned to the processing worker node (e.g., assigned by partition assignment 632). In some embodiments, processing worker node(s) 624 may act as retrieval nodes that respond to read requests from data consumer(s) 608. For fully-managed data streams, processing worker nodes(s) 624 may act as data consumers, performing operations to process the data records and deliver the data records to specified destination(s) 608, such as another service in the provider network (700 of FIG. 7), like object storage service 702, a distributed processing service, a database service 710, a data stream service 705, a data warehouse service, or other network-based services, or to a service, system, or destination outside of provider network 600. Operations to process the data records may be specified by clients.

In at least some embodiments, data processing system 630 may provide staged processing and delivery of data in a data stream. For instance, data processing 630 may maintain a workflow, graph, data structure or other representation of multiple stages of operations to be performed or delivered with respect to a data stream. For example, processing worker node(s) 634 may be directed to perform one or more processing operations for data, send the data to another service (e.g., a storage service, such as object store), then send a request to another service, such as distributed processing service, to access the stored data in the storage service and perform specified processing operations on the data in a distributed processing cluster. The worker processing node(s) 634 may then direct that the processed data from the distributed processing cluster may be stored in data warehouse service.

State information concerning the state of staged processing for a data stream may be maintained so that the next step or stage of processing data in the data stream may be identified. The workflow, graph, or data structure may indicate the various user identifiers, access keys, objects, configurations, or other information necessary to perform the desired stages. Processing worker node(s) 634 may be configured to perform the various requests, formatted to respective interfaces, such as APIs, which may instigate processing of the stage at a destination. Thus, processing worker node(s) 634 may direct the processing of data in the data stream in addition to performing processing locally, in some embodiments. Delivery of data for managed data streams may be subject to the availability of a destination to accept the processed data from processing worker node(s) 634.

In order to coordinate the operation of various subsystems within SMS 650, streaming data service management 660 may implement various management functions. For example, partition utilization tracking 642 may collect utilization data from ingestion node(s) 614, storage node(s) 624, and processing worker node(s) 634. Partition utilization data may include measures that indicate the utilization of storage (e.g., available storage, such as 10 gigabytes free), network (e.g., available bandwidth, such as 4 Mbps), and processing resources (e.g., available processing capacity, unallocated CPU capacity) to perform ingestion, storage, processing and/or backfilling of data in a data stream. The partition utilization data may be aggregated or evaluated on a per partition basis in order to make various control plane determinations. For example, in at least some embodiments, routing 612 may direct data records put into a data stream by a data producer 602 to one of the partitions of a data stream based on the utilization of the different partitions of the data stream (e.g., utilization at data ingestion 610, data stream storage 620, or data processing 630).

Similarly, repartitioning system 622, may detect repartitioning events to modify the number (e.g., increase or decrease) of partitions in a data stream automatically (without a user request to repartition) based on utilization data. For example, if utilization data indicates that the throughput capacity of ingestion node(s) 614, storage node(s) 624, or processing worker nodes(s) 634 assigned to the partitions of a data stream is near full utilization, repartitioning 622 may initiate a split operation for one or multiple partitions of the data stream to increase the number of partitions. Thus, repartitioning system 622 may manage the provisioning of additional ingestion node(s) 614, storage node(s) 624, or processing worker node(s) 634 to host or service the new partitions. Note that in a least some embodiments, repartitioning may repartition or reallocate some resources and not other resources (e.g., change the number of storage nodes and not ingestion or processing worker nodes). Repartitioning system 622 may also be configured to determine an initial partition scheme for a new data stream. Such a determination may be based on historical data, such as the partitioning schemes and performance of prior data streams created with similar features. Historical data may also be associated with a particular client or customer account associated with the new data stream, which may also be evaluated for similarities to identify a partitioning scheme. Machine learning techniques or predictive analysis may be performed on the historical data to identify the partitioning scheme, in some embodiments.

Partition assignments 632 for the various ingestion node(s) 614, storage node(s) 624, and processing worker node(s) 634 to partitions of respective data streams may be performed based on partition utilization data, whether performed upon creation of a data stream or as part of efforts to balance or redistribute the assignments of partitions in order to more efficiently utilize SMS 650 resources. For example, partition weights may be determined for each partition of a data stream. Assignment of partitions across the nodes may be performed so as to balance the average workload of nodes (instead of assigning the same number of nodes). Workload can be balanced across nodes according to a partition weight determined from partition utilization data.

Other partition metadata 644, including information describing the state of a data stream or configuration of a data stream (e.g., partitioning schemes, fully-managed or client-managed) may also be managed, maintained, and utilized by streaming data service management 660. Interface 600 of SMS 650 support one or more sets of programmatic interfaces (e.g., application programming interfaces (APIs), web pages or web sites, graphical user interfaces, or command-line tools) to enable the creation, configuration and deletion of data streams (both client-managed or fully-managed), as well as the submission, storage and retrieval of stream data records in some embodiments. These various interactions may be performed via the management interface 605 of SMS 650.

A number of different types of data producer(s) 602 may generate streams of data in different embodiments, such as, for example, mobile phone or tablet applications, sensor arrays, social media platforms, logging applications or system logging components, monitoring agents of various kinds, and so on. In order to reduce the burden of configuring or managing the interaction of data producer(s) 602 and SMS 650, some data producer(s) 602 may host or implement an agent provided by SMS 650. An agent may be an application, driver, or other component that may be obtained from SMS 650 (e.g., via a download) and installed upon a data producer 602. When a new data record is generated by the data producer, the agent may detect the new data record, format the data record for transport to SMS 650, and send via the operational interface 601 the data record to SMS 650 to be put into the data stream (e.g., via a "putRecord" request). In this way, data producers need not develop an application to make user of interface 601 to put data records into a data stream at SMS 650, but instead may rely upon obtaining agent to appropriately upload the data record.

For client-managed data streams, data consumer(s) 608 which are implemented separately from SMS 650 may be configured to access SMS 650 via interface 601. For example, data consumer(s) 608 may implement a client library provided by SMS 650 to utilize requests, such as "getNextRecords" when executing an application to retrieve the next data records to be processed in the data stream. Data consumer(s) 608 or processing worker node(s) 634 may perform idempotent processing of data streams (which may perform data consumption for fully managed data streams).

Figure 7:
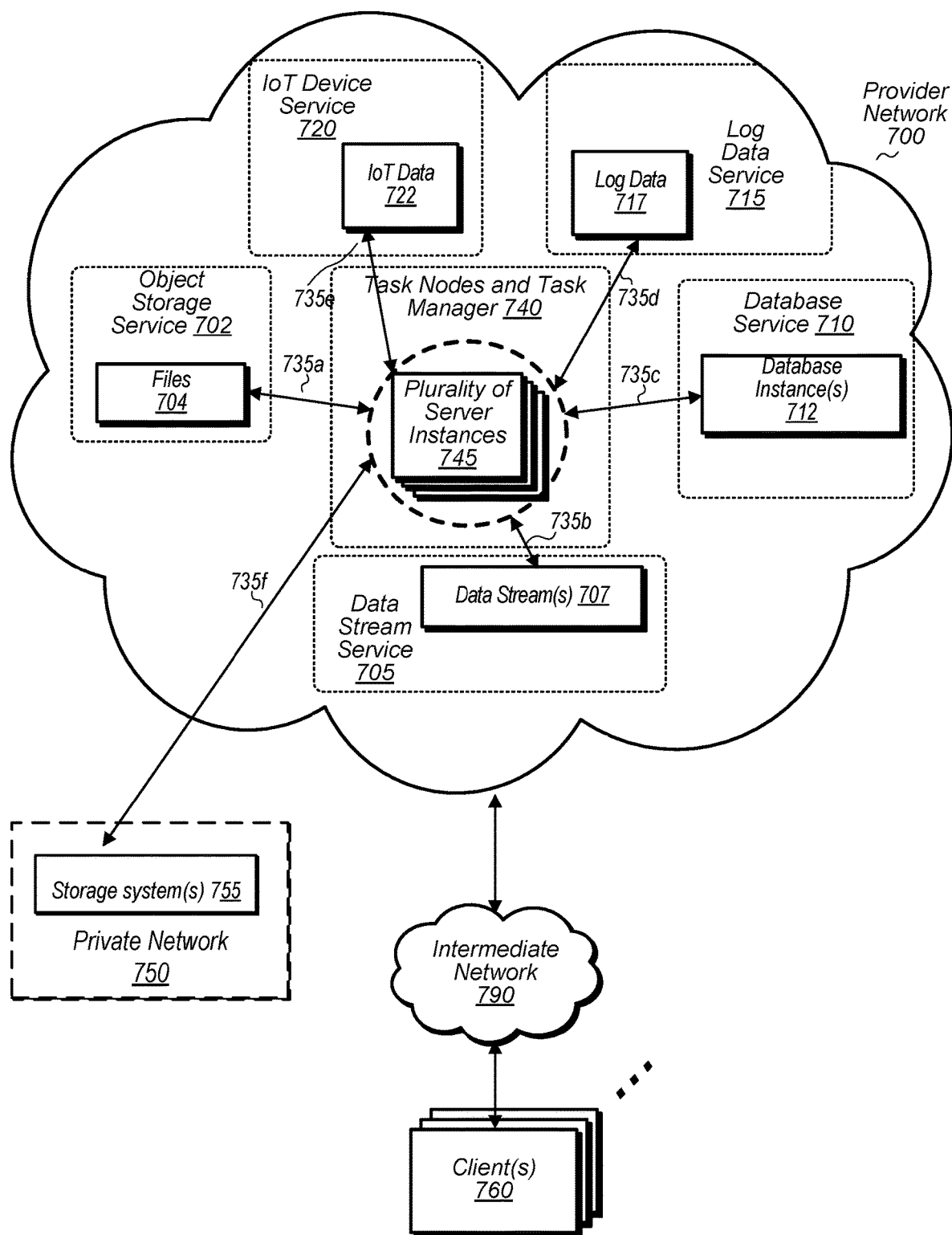
FIG. 7 illustrates an example provider network environment for the faster restart of task nodes using periodic checkpointing of data sources as well as the dynamic task configuration without task restart, where the task nodes and task manger are implemented by a plurality of server instances, and where they communicate with an IoT device service, a log data service, an object storage service, a database service, a data stream service, and/or an external private network, and where clients communicate with the provider network through an intermediate network, according to some embodiments.

FIG. 7 illustrates an example provider network 700 environment for the faster restart of task nodes using periodic checkpointing of data sources as well as the dynamic task configuration without task restart, where the task nodes and task manger 740 are implemented by a plurality of server instances 745. The task nodes and task manger 740 communicate with an IoT device service 722, a log data service 715, an object storage service 702, a database service 710, a data stream service 705, and/or an external private network 750, according to some embodiments. The clients 760 communicate with the provider network 700 through an intermediate network 790, according to some embodiments.

A service provider network 700 may provide computing resources via one or more computing services or event-driven computing services to the client(s) 760. The service provider network 700 may be operated by an entity to provide one or more services, such as various types of cloud-based computing or storage services, accessible via the Internet and/or other networks 790 to client(s) 760. In some embodiments, the service provider network 700 may implement a web server, for example hosting an e-commerce website. Service provider network 700 may include numerous data centers hosting various resource pools, such as collections of physical and/or virtualized computer servers, storage devices, networking equipment and the like, needed to implement and distribute the infrastructure and services offered by the service provider network 700. In some embodiments, service provider network may employ computing resources for its provided services. These computing resources may in some embodiments be offered to client(s) 760 in units called "instances," such as virtual compute instances.

A provider network 700 may provide resource virtualization to clients via one or more virtualization services that allow clients to access, purchase, rent, or otherwise obtain instances of virtualized resources, including but not limited to computation and storage resources, implemented on devices within the provider network or networks in one or more data centers. In some embodiments, private IP addresses may be associated with the resource instances; the private IP addresses are the internal network addresses of the resource instances on the provider network 700. In some embodiments, the provider network 700 may also provide public IP addresses and/or public IP address ranges (e.g., Internet Protocol version 4 (IPv4) or Internet Protocol version 6 (IPv6) addresses) that clients may obtain from the provider 700.

Conventionally, the provider network 700, via the virtualization services, may allow a client of the service provider (e.g., a client that operates clients 760) to dynamically associate at least some public IP addresses assigned or allocated to the client with particular resource instances assigned to the client. The provider network 700 may also allow the client to remap a public IP address, previously mapped to one virtualized computing resource instance allocated to the client, to another virtualized computing resource instance that is also allocated to the client. Using the virtualized computing resource instances and public IP addresses provided by the service provider, a client of the service provider such as the operator of clients 760 may, for example, implement client-specific applications and present the client's applications on an intermediate network 790, such as the Internet. Either the clients 760 or other network entities on the intermediate network 790 may then generate traffic to a destination domain name published by the clients 760. First, either the clients 760 or the other network entities can make a request through a load balancer for a connection to a compute instance in the plurality of compute instances.

A load balancer can respond with the identifying information which might include a public IP address of itself. Then the clients 760 or other network entities on the intermediate network 790 may then generate traffic to public IP address that was received by the router service. The traffic is routed to the service provider data center, and at the data center is routed, via a network substrate, to the private IP address of the network connection manager currently mapped to the destination public IP address. Similarly, response traffic from the network connection manager may be routed via the network substrate back onto the intermediate network 740 to the source entity.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance. Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 700; a client may then assign their allocated public IP addresses to particular resource instances allocated to the client. These public IP addresses may be referred to as client public IP addresses, or simply client IP addresses. Instead of being assigned by the provider network 700 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. A client IP address can be an Elastic IP address. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

A provider network 700 may provide a compute service, or an event-driven compute service, implemented by physical server nodes to clients 760, which includes a plurality of compute instances. The compute service also contains many other server instances for many other clients and other customers of the provider network 700. As another example, the provider network provides a virtualized data storage service or object storage service 702 which can include a plurality of data storage instances implemented by physical data storage nodes. The data storage service or object storage service 702 can store files 704 for the client, which are accessed through a file access 735a by the appropriate server instance of the client. As another example, the provider network might provide a virtualized database service 710 implemented by database instances 712, which includes at least one database instance for a client. A server instance pertaining to the client in the compute service can access a database instance pertaining to the client when needed through a database access 735c. The database service can contain a database instance that includes a database of sources of data. The database service and data storage service also contain multiple files or database instances that pertain to other clients and other customers of the provider network 700. The provider network can also include multiple other client services that pertain to one or more customers. For example, the provider network 700 can include a data stream service 705 to customers. This data stream service 705 can include data stream (s0 707 that delivers a stream of data to the task nodes 740. The clients 760 may access any one of the client services 702, 720, 715, 710, or 705 for example, via an interface, such as one or more APIs to the service, to obtain usage of resources (e.g., data storage instances, or files, or database instances, or server instances) implemented on multiple nodes for the service in a production network portion of the provider network 700.

Figure 8:
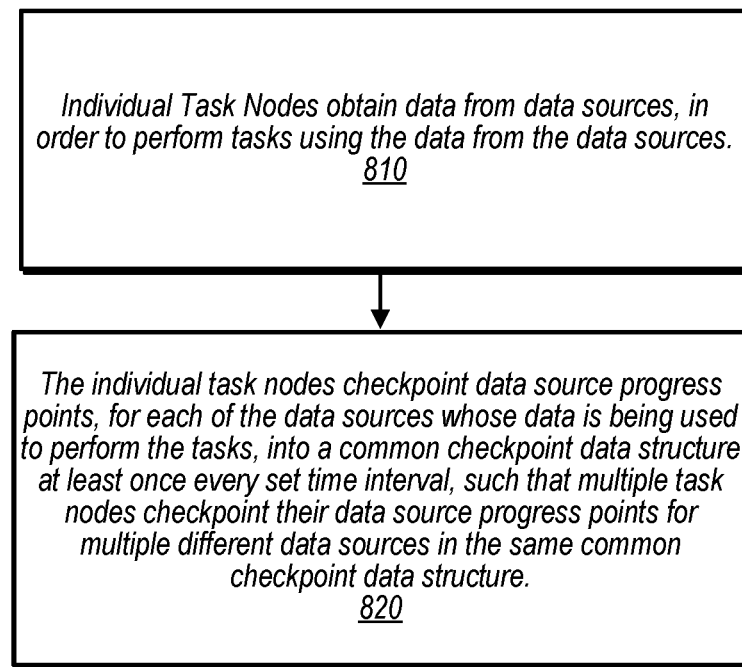
FIG. 8 is a high-level flow chart illustrating methods and techniques for faster restart of task nodes using periodic checkpointing of data sources comprising actions taken by individual task nodes of a plurality of task nodes, according to some embodiments.

Illustrative Methods of Faster Restart of Task Nodes Using Periodic Checkpointing of Data Sources FIG. 8 is a high-level flow chart illustrating methods and techniques for faster restart of task nodes using periodic checkpointing of data sources comprising actions taken by individual task nodes of a plurality of task nodes, according to some embodiments. The method begins in block 810 where individual Task Nodes obtain data from data sources, in order to perform tasks using the data from the data sources. The flowchart then transitions to block 820 where the individual task nodes checkpoint data source progress points, for each of the data sources whose data is being used to perform the tasks, into a common checkpoint data structure at least once every set time interval, such that multiple task nodes checkpoint their data source progress points for multiple different data sources in the same common checkpoint data structure.

Figure 9:
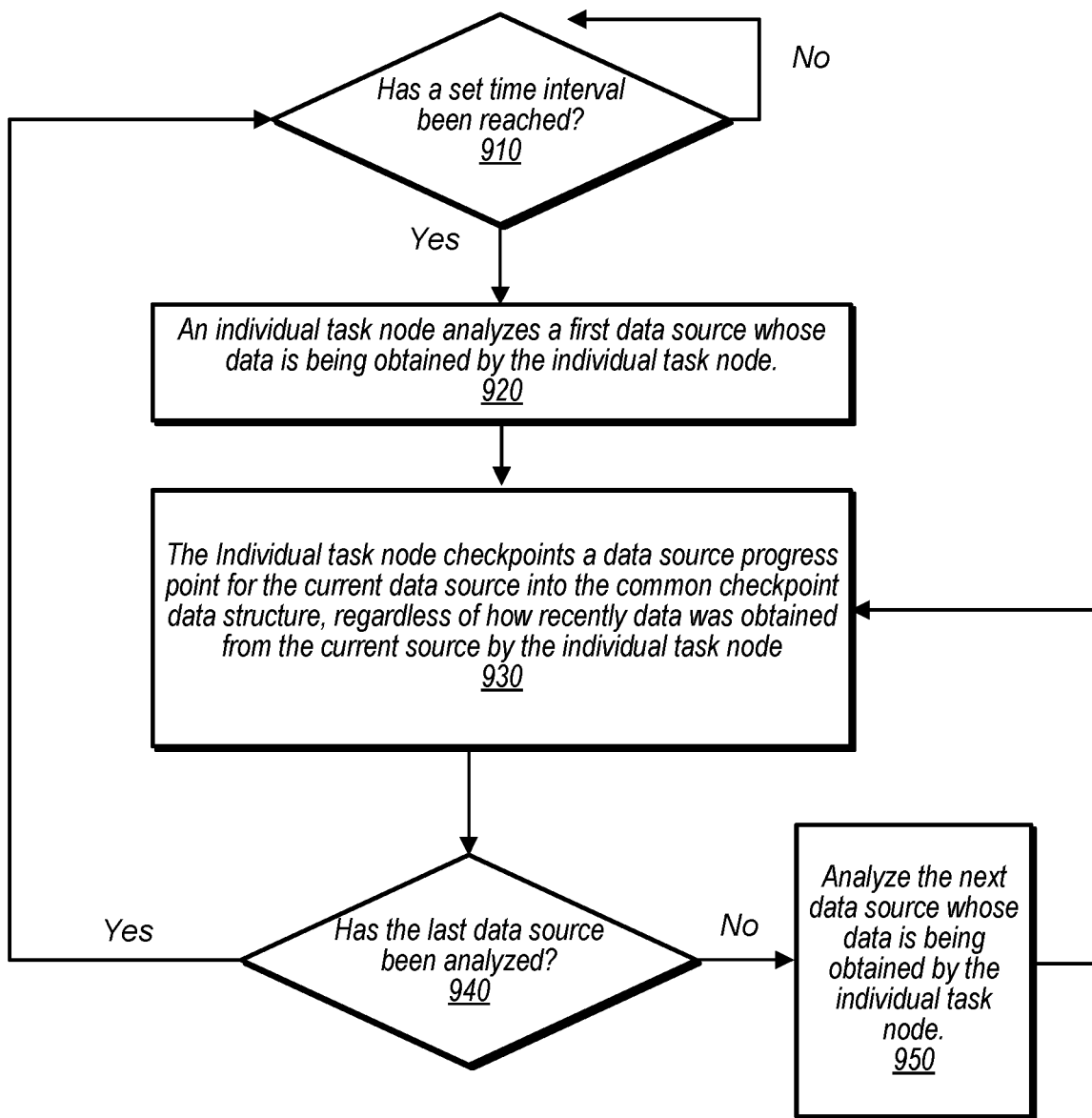
FIG. 9 is a high-level flow chart illustrating methods and techniques for faster restart of task nodes using periodic checkpointing of data sources comprising actions taken by individual task nodes of a plurality of task nodes to checkpoint data source progress points into the common checkpoint data structure regardless of how recently data was handled by the individual task nodes.

FIG. 9 is a high-level flow chart illustrating methods and techniques for faster restart of task nodes using periodic checkpointing of data sources comprising actions taken by individual task nodes of a plurality of task nodes to checkpoint data source progress points into the common checkpoint data structure regardless of how recently data was handled by the individual task nodes. The flowchart begins at block 910 which determines whether a set time interval has been reached. The decision block 910 loops back on itself until the set time interval has been reached. When the set time interval has been reached, the flowchart transitions to block 920 where an individual task node analyzes a first data source whose data is being obtained by the individual task node.

The flowchart then transitions to block 930 where the individual task node checkpoints a data source progress point for the current data source into the common checkpoint data structure, regardless of how recently data was obtained from the current source by the individual task node. The flowchart then transitions to block 940 which determines whether the last data source has been analyzed. If the last data source has been analyzed the flowchart transitions back to block 910 which again waits for the set time interval to be reached. If the last data source has not been analyzed, the flowchart transitions to block 950 which analyzes the next data source whose data is being obtained by the individual task node. The flowchart then transitions back to block 930 to checkpoint a data source progress point tor that next data source.

Figure 10:
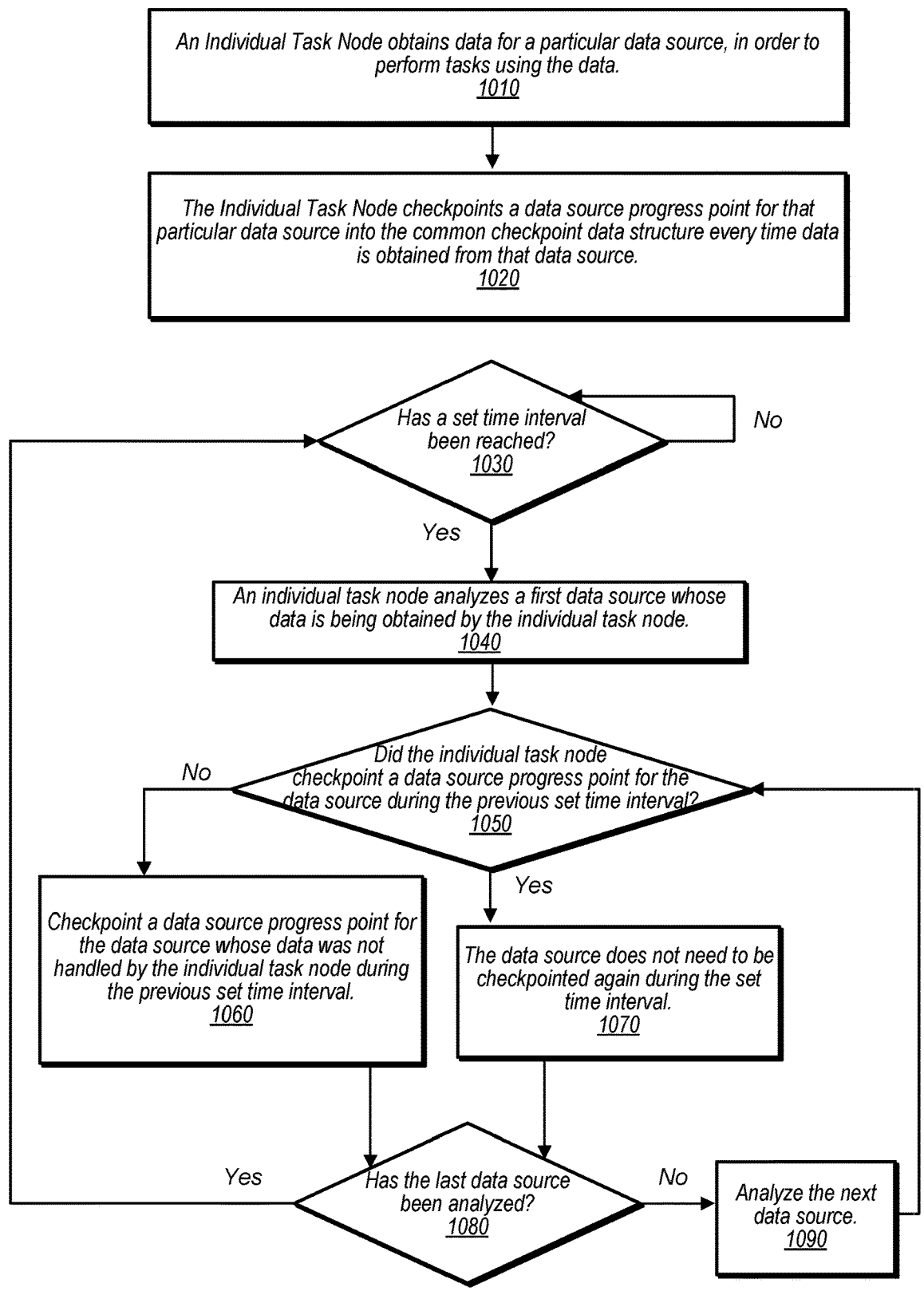
FIG. 10 is a high-level flow chart illustrating methods and techniques for faster restart of task nodes using periodic checkpointing of data sources comprising actions taken by a task nodes to obtain data from sources to perform tasks and then checkpoint progress points after the data is obtained, where the task node also checkpoints, after a set time interval, data source progress points for data sources whose data was not obtained during the previous set time interval.

FIG. 10 is a high-level flow chart illustrating methods and techniques for faster restart of task nodes using periodic checkpointing of data sources comprising actions taken by a task nodes to obtain data from sources to perform tasks and then checkpoint progress points after the data is obtained, where the task node also checkpoints, after a set time interval, data source progress points for data sources whose data was not obtained during the previous set time interval.

The first flowchart in FIG. 10 begins at 1010 where an Individual Task Node obtains data for a particular data source, in order to perform tasks using the data. The flowchart then transitions to block 1020 where the Individual Task Node checkpoints a data source progress point for that particular data source into the common checkpoint data structure every time data is obtained from that data source.

The second flowchart in FIG. 10 begins at 1030 which, like block 910, determines whether a set time interval has been reached. The decision block 1030 loops back on itself until the set time interval has been reached. When the set time interval has been reached, the flowchart transitions to block 1040 where an individual task node analyzes a first data source whose data is being obtained by the individual task node. The flowchart then transitions to block 1050 which determines whether the individual task node checkpointed a data source progress point for the current data source during the previous set time interval. In the first time through the loop the current data source will be the first data source, for example. If the individual task node checkpointed a data source progress point for the current data source during the previous set time interval, then the data source does not need to be checkpointed again during the set time interval in block 1070. The flowchart then transitions to block 1080. If the individual task node did not checkpoint a data source progress point for the current data source during the previous set time interval, then the flowchart transitions to block 1060. Block 1060 checkpoints a data source progress point for the current data source whose data was not handled by the individual task node during the previous set time interval. Block 1060 then also transitions to block 1080.

Block 1080, like block 940, determines whether the last data source has been analyzed. If the last data source has been analyzed the flowchart transitions back to block 1030 which again waits for the set time interval to be reached. If the last data source has not been analyzed, the flowchart transitions to block 1090 which analyzes the next data source. The flowchart then transitions back to block 1050 to determine whether the task node checkpointed a data source progress point for that next data source.

Figure 11:
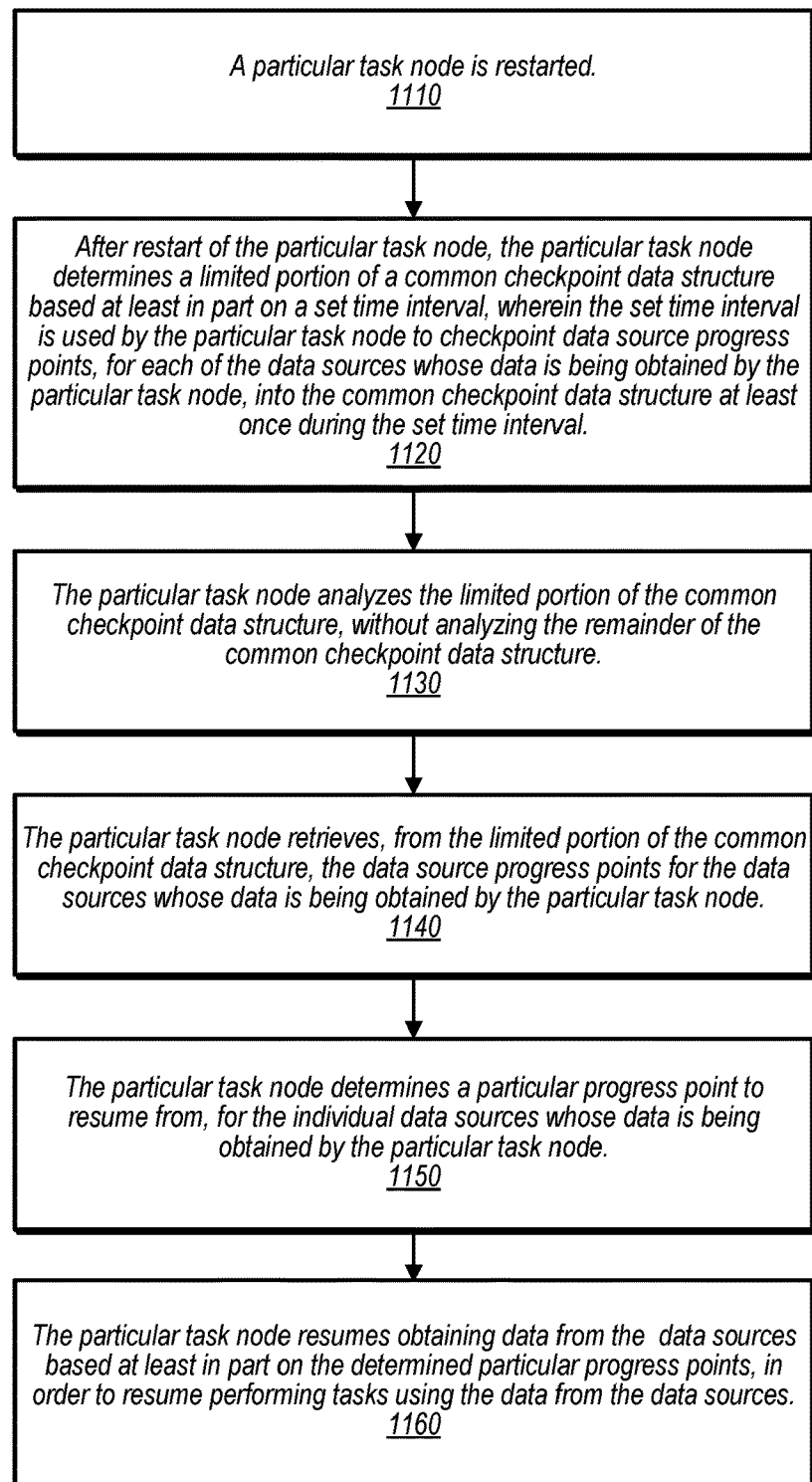
FIG. 11 is a logical block diagram depicting faster restart of task nodes using periodic checkpointing of data sources comprising a particular task node that, after restart, analyzes a portion of the common checkpoint data structure, retrieves data source progress points, and resumes performing a task using the retrieves progress points for data sources.

FIG. 11 is a logical block diagram depicting faster restart of task nodes using periodic checkpointing of data sources comprising a particular task node that, after restart, analyzes a portion of the common checkpoint data structure, retrieves data source progress points, and resumes performing a task using the retrieves progress points for data sources.

The flowchart begins at block 1110 where a particular task node is restarted. The flowchart then transitions to block 1120, where after restart of the particular task node, the particular task node determines a limited portion of a common checkpoint data structure based at least in part on a set time interval, wherein the set time interval is used by the particular task node to checkpoint data source progress points, for each of the data sources whose data is being obtained by the particular task node, into the common checkpoint data structure at least once during the set time interval. The flowchart then transitions to block 1130 where the particular task node analyzes the limited portion of the common checkpoint data structure, without analyzing the remainder of the common checkpoint data structure.

The flowchart in FIG. 11 then transitions to block 1140 where the particular task node retrieves, from the limited portion of the common checkpoint data structure, the data source progress points for the data sources whose data is being obtained by the particular task node. The flowchart transitions to block 1150 where the particular task node determines a particular progress point to resume from, for the individual data sources whose data is being obtained by the particular task node. Finally, the flowchart transitions to block 1160 where the particular task node resumes obtaining data from the data sources based at least in part on the determined particular progress points, in order to resume performing tasks using the data from the data sources.

Illustrative Methods of Dynamic Task Configuration without Task Restart

Figure 12:
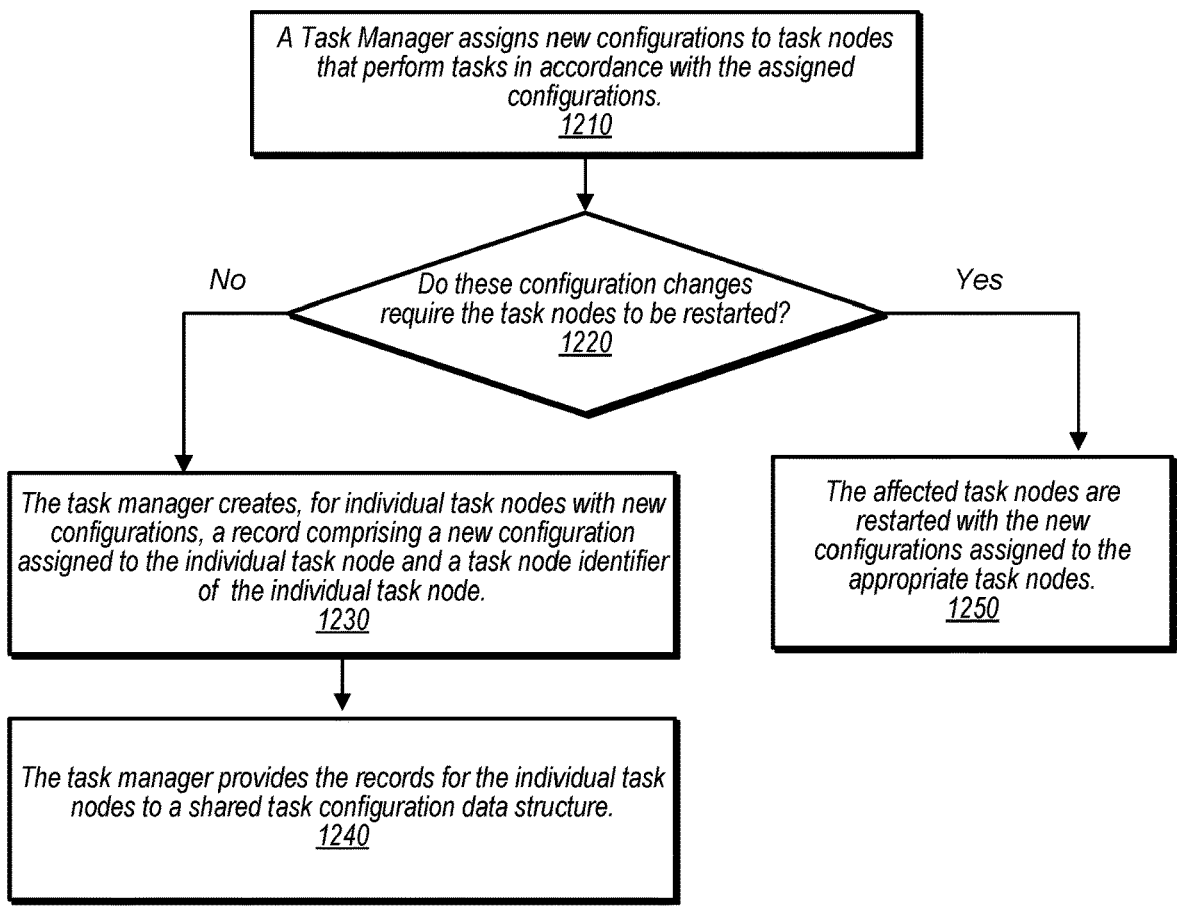
FIG. 12 is a high-level flow chart illustrating methods and techniques for dynamic task configuration without task restart comprising actions taken by a task manager that manages a plurality of task nodes, according to some embodiments.
Figure 13:
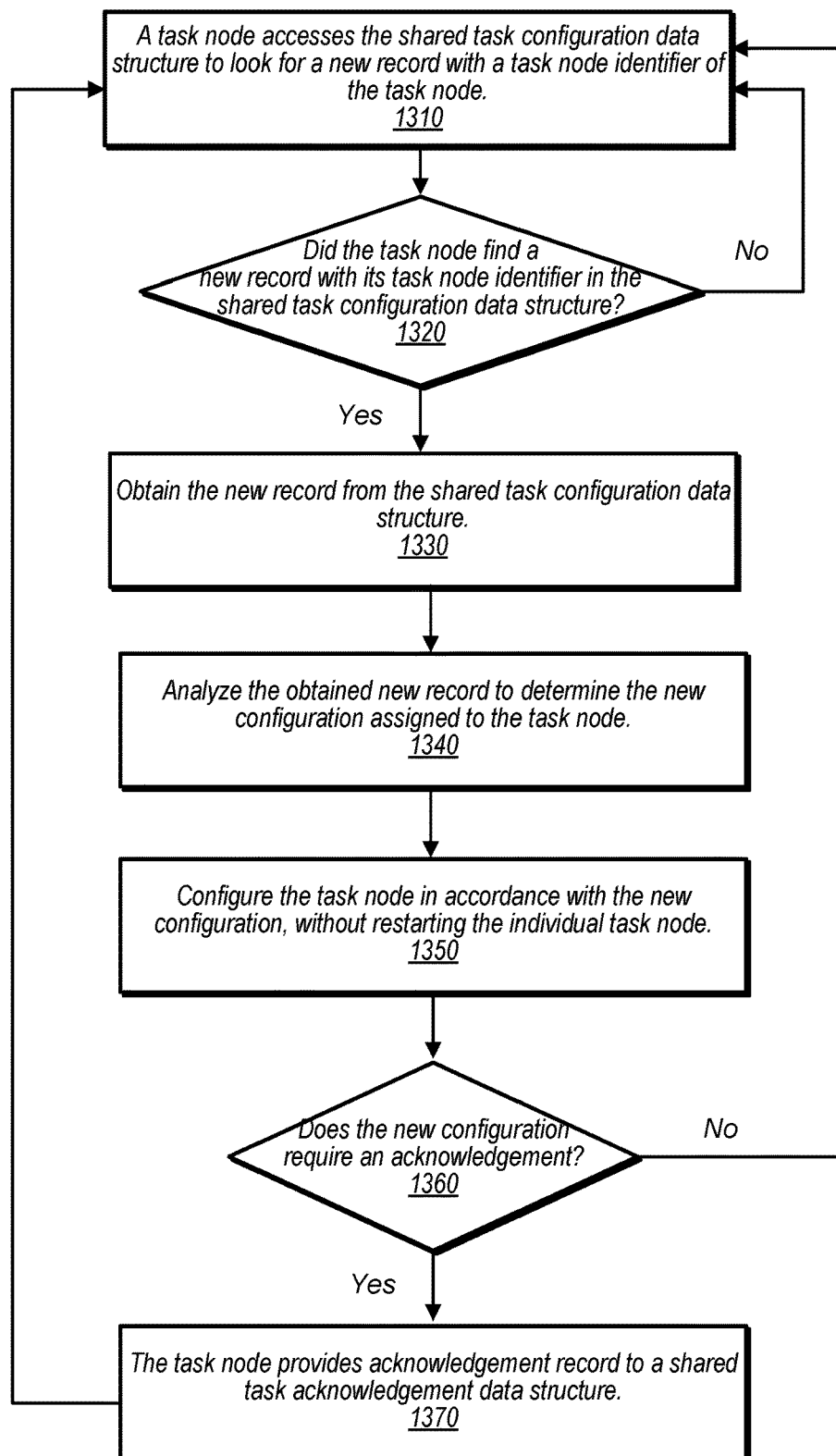
FIG. 13 is a high-level flow chart illustrating methods and techniques for dynamic task configuration without task restart comprising actions taken by a task node of a plurality of task nodes, according to some embodiments.

FIG. 12 is a high-level flow chart illustrating methods and techniques for dynamic task configuration without task restart comprising actions taken by a task manager that manages a plurality of task nodes, according to some embodiments. The flowchart begins at block 1210 where a Task Manager assigns new configurations to task nodes that perform tasks in accordance with the assigned configurations. The flowchart then transitions to block 1220 which determines whether the configuration changes require the task nodes to be restarted. If the configuration changes require the task nodes to be restarted, the flowchart transitions to block 1250 where the affected task nodes are restarted with the new configurations assigned to the appropriate task nodes. If the configuration changes do not require the task nodes to be restarted, then the flowchart transitions to block 1230 where the task manager creates, for individual task nodes with new configurations, a record comprising a new configuration assigned to the individual task node and a task node identifier of the individual task node. After block 1230 the flowchart transitions to block 1240 where the task manager provides the records for the individual task nodes to a shared task configuration data structure FIG. 13 is a high-level flow chart illustrating methods and techniques for dynamic task configuration without task restart comprising actions taken by a task node of a plurality of task nodes, according to some embodiments. The flowchart begins at block 1310 where a task node accesses the shared task configuration data structure to look for a new record with a task node identifier of the task node. If the task node, in block 1320, does not finds a new record with its task node identifier in the shared configuration data structure, then the flowchart returns to 1310 to access the shared task configuration data structure again at a later time. However, if the task node, in block 1320, finds a new record with its task node identifier in the shared configuration data structure then the flowchart transitions to block 1330.

Block 1330 obtains the new record from the shared task configuration data structure. Then, block 1340 analyzes the obtained new record to determine the new configuration assigned to the task node. Next, in block 1350, the task node configure itself in accordance with the new configuration, without restarting the individual task node. The flowchart then transitions to block 1360 which asks whether the new configuration requires an acknowledgement. If the new configuration does not require an acknowledgement, then the flowchart simply returns to 1310 to access the shared task configuration data structure again at a later time. If the new configuration does require an acknowledgement, then the flowchart transitions to block 1370 where the task node provides an acknowledgement record to a shared task acknowledgement data structure. After this acknowledgement record is provided, then the flowchart returns to 1310 to access the shared task configuration data structure again at a later time.

Figure 14:
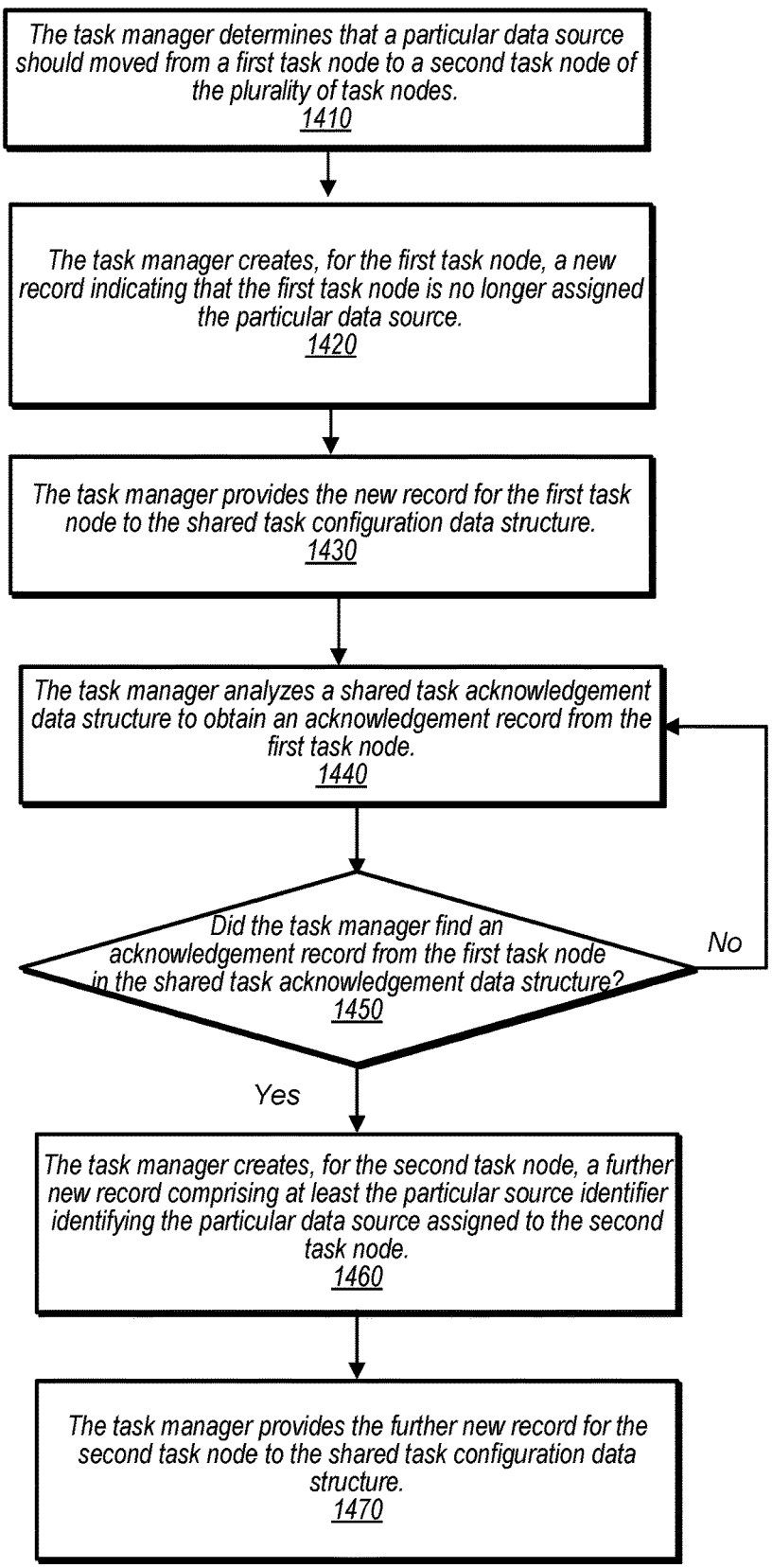
FIG. 14 is a high-level flow chart illustrating methods and techniques for dynamic task configuration without task restart comprising actions taken by a task manager that manages a plurality of task nodes to move a data source from a first task node to a second task node, according to some embodiments

FIG. 14 is a high-level flow chart illustrating methods and techniques for dynamic task configuration without task restart comprising actions taken by a task manager that manages a plurality of task nodes to move a data source from a first task node to a second task node, according to some embodiments. The flowchart begins at block 1410 where the task manager determines that a particular data source should move from a first task node to a second task node of the plurality of task nodes. The flowchart then transitions to block 1420 where the task manager creates, for the first task node, a new record indicating that the first task node is no longer assigned the particular data source. The flowchart then transitions to block 1430 where the task manager provides the new record for the first task node to the shared task configuration data structure.

The flowchart in FIG. 14 then transitions to bock 1440 where the task manager analyzes a shared task acknowledgement data structure to obtain an acknowledgement record from the first task node. The flowchart transitions to block 1450 which asks whether the task manager find an acknowledgement record from the first task node in the shared task acknowledgement data structure. If the task manager did not find an acknowledgement record from the first task node in the shared task acknowledgement data structure, then the flowchart transitions back to block 1440 for the task manager to again analyze the shared task acknowledgement data structure at a later time to obtain an acknowledgement record from the first task node. If the task manager did find an acknowledgement record from the first task node in the shared task acknowledgement data structure in block 1450, then the flowchart transitions to block 1460 where the task manager creates, for the second task node, a further new record comprising at least the particular source identifier identifying the particular data source assigned to the second task node. The flowchart finishes in block 1470 where the task manager provides the further new record for the second task node to the shared task configuration data structure.

Illustrative System

Figure 15:
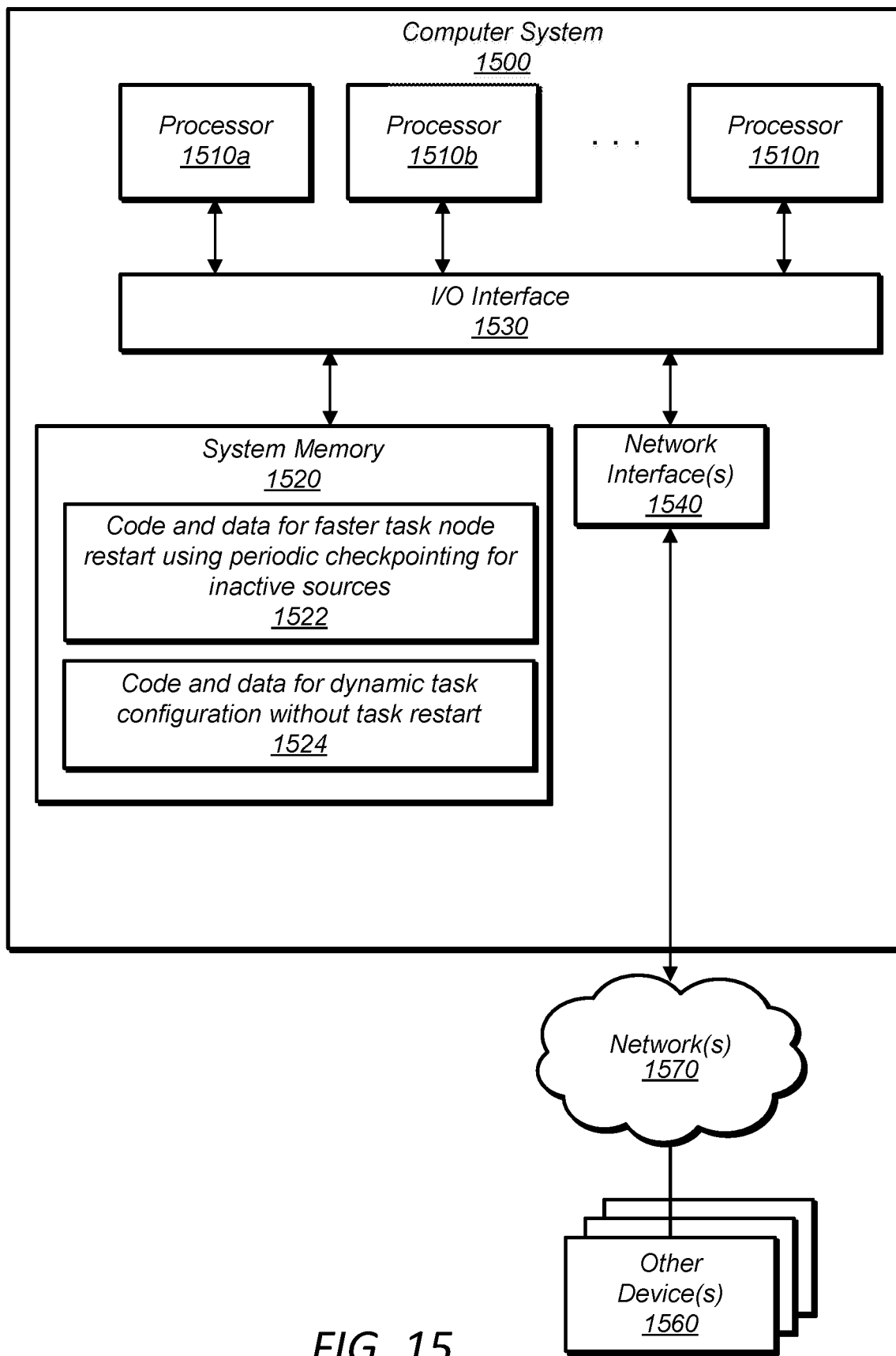
FIG. 15 is a block diagram illustrating an example computer system, according to some embodiments.

FIG. 15 is a block diagram illustrating an example computer system that may be used for faster restart of task nodes using periodic checkpointing of data sources and dynamic task configuration without task restart, according to some embodiments. In at least some embodiments, a computer that implements a portion or all of the methods and apparatus for faster restart of task nodes using periodic checkpointing of data sources and dynamic task configuration without task restart, as described herein, may include a general-purpose computer system or computing device that includes or is configured to access one or more computer-accessible media, such as computer system 1500 illustrated in FIG. 15. FIG. 15 is a block diagram illustrating an example computer system that may be used in some embodiments. This computer system can be used as a task manager or a task node, for example, or as a backend resource host which executes one or more of backend resource instances or one or more of the plurality of server instances (745 of FIG. 7) in a compute service. In the illustrated embodiment, computer system 1500 includes one or more processors 1510 coupled to a system memory 1520 via an input/output (I/O) interface 1530. Computer system 1500 further includes a network interface 1540 coupled to I/O interface 1530.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store instructions and data accessible by processor(s) 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for faster restart of task nodes using periodic checkpointing of data sources and dynamic task configuration without task restart, are shown stored within system memory 1520 as the code and data for faster restart of task nodes using periodic checkpointing of data sources 1522 and the code and data for dynamic task configuration without task restart 1524.

In one embodiment, I/O interface 1530 may be configured to coordinate I/O traffic between processor 1510, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices 1560 attached to a network or networks 1570, such as other computer systems or devices as illustrated in FIGS. 1-7, for example. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-accessible medium configured to store program instructions and data as described above for FIGS. 1 through 14 for implementing faster restart of task nodes using periodic checkpointing of data sources and dynamic task configuration without task restart. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1500 via I/O interface 1530. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

Any of various computer systems may be configured to implement processes associated with the provider network, the task manager, the task nodes, the connect cluster, or any other component of the above figures. In various embodiments, the provider network, the task manager, the task nodes, the connect cluster, the client devices, the edge devices, tier devices, or any other component of any of FIGS. 1-7 may each include one or more computer systems 1500 such as that illustrated in FIG. 15. In embodiments, the provider network, the task manager, the task nodes, the connect cluster, the client devices, the edge devices, tier devices, or any other component of any of FIGS. 1-7 may include one or more components of the computer system 1500 that function in a same or similar way as described for the computer system 1500.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a plurality of computing devices respectively comprising one or more processors and a memory, configured to implement a plurality of task nodes, wherein the plurality of task nodes are virtualized computing instances;
   wherein the plurality of task nodes are configured, via executable instructions, to perform a respective one or more tasks in accordance with respective configurations assigned by a task manager to the respective task nodes to perform the respective one or more tasks; and
   a further one or more computing devices respectively comprising a further one or more processors and memory, configured to implement the task manager;
   wherein the task manager that assigned the one or more tasks is configured, via executable instructions, to:
     detect an event that causes new configurations to be applied to the plurality of task nodes;
     evaluate the new configurations to identify at least one of the new configurations that can be assigned to a task node of the plurality of task nodes to be performed using task node self-reconfiguration based, at least in part, on determining that the task node can reconfigure itself without restarting the task node and the one or more tasks being performed by the task node;

assign the identified at least one new configuration to the task node for task node self-configuration, wherein to assign the at least one new configuration, the task manager:
  creates, for the task node, a new record comprising the at least one new configuration and a task node identifier that identifies the task node; and
  adds the new record for the task node to a shared task configuration data structure accessible by the plurality of task nodes, wherein the shared task configuration data structure is implemented at the task manager; and
wherein the evaluation of the new configurations identifies a different one of the new configurations that uses a task manager performed reconfiguration to apply the different one of the new configurations to a different task node of the plurality of task nodes; and
wherein the task node is further configured to:
  access the shared task configuration data structure to identify the new record having the task node identifier that identifies the task node;
  obtain the new record from the shared task configuration data structure;
  analyze the obtained new record to determine the at least one of the new configurations assigned to the task node; and
  reconfigure the task node in accordance with the at least one of the new configurations with self-reconfiguration, without restarting the respective task assigned to and started at the respective task node and without restarting the respective task node.

2. The system of claim 1, wherein the plurality of task nodes are configured to implement a data ingestion system for a streaming data store, wherein the data ingestion system obtains data from a plurality of data sources, wherein the at least one of the new configurations assigned by the task manger to the task node pertains to assigning one or more of the plurality of data sources to the task node to obtain data from, and wherein the respective one or more tasks performed by a reminder of the plurality of task nodes import the obtained data into output data streams of the streaming data store.

3. The system of claim 2, wherein the streaming data store comprises one or more broker components, wherein the output data streams of the streaming data store are maintained as one or more output topics by the one or more brokers, and wherein the shared task configuration data structure is maintained as a configuration topic.

4. The system of claim 1, wherein the task manager is further configured to restart the different task node of the plurality of task nodes that is assigned the different one of the new configurations identified as using the task manager performed reconfiguration to apply the different one of the new configurations to the different task node.

5. The system of claim 4, wherein the restarting the different task node that is assigned the different one of the new configurations that uses the task manager performed reconfiguration to apply the different one of the new configurations is a default mechanism for the task manager to assign configuration changes to the plurality of task nodes, and wherein the use of the shared task configuration data structure is an exception to the default mechanism for the task manager to assign configuration changes to the plurality of task nodes.

6. A method comprising:
performing by a task manager of a plurality of task nodes that perform a respective one or more tasks in accordance with respective configurations assigned by the task manager to perform the respective one or more tasks, wherein the plurality of task nodes are virtualized computing instances, comprising:
  detecting an event that causes new configurations to be applied to the plurality of task nodes;
  evaluating the new configurations to identify at least one of the new configurations that can be assigned to a task node of the plurality of task nodes to be performed using task node self-reconfiguration based, at least in part, on determining that the task node can reconfigure itself without restarting the task node and the one or more tasks being performed by the task node;
  assigning the identified at least one new configuration to the task node for task node self-reconfiguration, wherein assigning the identified at least one new configuration, includes:
    creating, by the task manager, for the task node, a new record comprising the at least one new configuration and a task node identifier that identifies the task node; and
    adding, by the task manager, the new record for the task node to a shared task configuration data structure accessible by the plurality of task nodes, wherein the shared task configuration data structure is implemented at the task manager; and
  wherein the evaluation of the new configurations identifies a different one of the new configurations that uses task manager performed reconfiguration to apply the different one of the new configurations to a different task node of the plurality of task nodes; and
performing by the task node:
  accessing the shared task configuration data structure to identify the new record having the task node identifier that identifies the task node;
  obtaining the new record from the shared task configuration data structure;
  analyzing the obtained new record to determine the at least one of the new configurations assigned to the task node; and
  reconfiguring the task node in accordance with the at least one of the new configurations with self-reconfiguration, without restarting the respective task assigned to and started at the respective task node and without restarting the respective task node.

7. The method of claim 6, wherein the task manager further performs restarting the different task node of the plurality of task nodes that is assigned the different one of the new configurations identified as using the task manager performed reconfiguration to apply the different one of the new configurations to the different task node.

8. The method of claim 7, wherein the restarting the different task node that is assigned the different one of the new configurations that uses the task manager performed reconfiguration to apply the different one of the new configurations is a default mechanism for the task manager to assign configuration changes to the plurality of task nodes, and wherein the use of the shared task configuration data structure is an exception to the default mechanism for the task manager to assign configuration changes to the plurality of task nodes.

9. The method of claim 6, wherein the plurality of task nodes implement a data ingestion system for a streaming data store, wherein the data ingestion system obtains data from a plurality of data sources, wherein the at least one of the new configurations assigned by the task manger to the task node pertains to assigning one or more of the plurality of data sources to the task node to obtain data from, and wherein the respective one or more tasks performed by a reminder of the plurality of task nodes import the obtained data into output data streams of the streaming data store.

10. The method of claim 9, wherein the wherein the task manager further performs:
   assigning an additional source to a particular task node of the plurality of task nodes;
   creating, for the particular task node, a new record comprising a source identifier identifying the additional source; and
   adding the new record for the particular task node to the shared task configuration data structure.

11. The method of claim 9, wherein the task manager further performs:
   determining which particular task node of the plurality of task nodes a first data source to be removed was assigned to;
   creating, for the particular task node, a new record indicating that the particular task node is no longer assigned to the first data source; and
   adding the new record for the particular task node to the shared task configuration data structure.

12. The method of claim 9, wherein the task manager further performs:
   determining that a particular data source of the plurality of data sources should move from a first task node to a second task node of the plurality of task nodes;
   creating, for the first task node, a new record indicating that the first task node is no longer assigned the particular data source;
   providing the new record for the first task node to the shared task configuration data structure;
   creating, for the second task node, a further new record comprising at least the particular source identifier identifying the particular data source assigned to the second task node; and
   providing the further new record for the second task node to the shared task configuration data structure.

13. The method of claim 12, wherein the providing the further new record for the second task node to the shared task configuration data structure is performed in response to an acknowledgement of the new record from the first task node through a shared task acknowledgement data structure.

14. The method of claim 9, wherein the plurality of data sources are groupings of one or more different directories and files in a file system, wherein the respective task nodes are assigned a respective one or more of the groupings to obtain data from, and wherein the respective task nodes import the obtained data into the streaming data store.

15. The method of claim 9, wherein the plurality of data sources are clients of the streaming data store, and wherein the respective task nodes are assigned a respective one or more of the clients to obtain data from, and wherein the respective task nodes import the obtained data into the streaming data store.

16. One or more non-transitory computer-readable storage media storing program instructions, that when executed on or across one or more processors of a task manager and a plurality of task nodes that perform a respective one or more tasks in accordance with respective configurations assigned by the task manager to perform the respective one or more tasks, wherein the plurality of task nodes are virtualized computing instances, cause the one or more processors to:
   detect, by the task manager an event that causes new configurations to be applied to the plurality of task nodes;
   evaluate, by the task manager, the new configurations to identify the at least one of the new configurations that can be assigned to a task node of the plurality of task nodes to be performed using task node self-reconfiguration based, at least in part, on determining that the task node can reconfigure itself without restarting the task node and the one or more tasks being performed by the task node;
   assign, by the task manager, the identified at least one new configuration to the task node for task node self-reconfiguration, wherein to assign the identified at least one new configuration, the task manager:
      creates, for the task node, a new record comprising the at least one new configuration and a task node identifier that identifies the task node; and
      adds, the new record for the task node to a shared task configuration data structure accessible by the plurality of task nodes, wherein the shared task configuration data structure is implemented at the task manager; and
   wherein the evaluation of the new configurations identifies, by the task manager, a different one of the new configurations that uses task manager performed reconfiguration to apply the different one of the new configurations to a different task node of the plurality of task nodes;
   access, by the task node of the plurality of task nodes, the shared task configuration data structure to identify the new record having the task node identifier that identifies the task node;
   obtain, by the task node, the new record from the shared task configuration data structure;
   analyze, by the task node, the obtained new record to determine the at least one of the new configurations assigned to the task node; and
   reconfigure, by the task node, the task node in accordance with the at least one of the new configurations, without restarting the task assigned to and started at the task node without restarting the task node.

17. The one or more non-transitory computer-readable storage media of claim 16, wherein the plurality of task nodes are configured to implement a data ingestion system for a streaming data store, wherein the data ingestion system obtains data from a plurality of data sources, wherein the at least one of the new configurations assigned by the task manger to the task node pertains to assigning one or more of the plurality of data sources to the task node to obtain data from, and wherein the respective one or more tasks performed by a reminder of the plurality of task nodes import the obtained data into output data streams of the streaming data store.

18. The one or more non-transitory computer-readable storage media of claim 17, wherein the program instructions further cause the one or more processors of the task manager to:
   determine that a particular data source of the plurality of data sources should move from a first task node to a second task node of the plurality of task nodes;

create, for the first task node, a new record indicating that the first task node is no longer assigned the particular data source;
provide the new record for the first task node to the shared task configuration data structure;
create, for the second task node, a further new record comprising at least the particular source identifier identifying the particular data source assigned to the second task node; and
provide the further new record for the second task node to the shared task configuration data structure.

19. The one or more non-transitory computer-readable storage media of claim 16, wherein the program instructions further cause the one or more processors of the task manager to:
use a load balancing algorithm to apply the new configurations to the plurality of task nodes.

20. The one or more non-transitory computer-readable storage media of claim 19, wherein the program instructions further cause the one or more processors of the task manager and a plurality of task nodes to:
provide, by the respective task nodes, respective loads of the respective task nodes to a task load data structure;
periodically analyze, by the task manager, the task load data structure to receive the respective loads for the respective task nodes; and
use, by the task manager, the received respective loads for the respective task nodes in the load balancing algorithm to determine the new configurations to apply to the plurality of task nodes.

* * * * *